(12) United States Patent  (10) Patent No.: US 8,542,565 B2
Nishiyama  (45) Date of Patent: Sep. 24, 2013

(54) OPTICAL DRIVE APPARATUS

(75) Inventor: Tetsuya Nishiyama, Tokyo (JP)

(73) Assignee: TDK Corporation, Tokyo (JP)

( * ) Notice: Subject to any disclaimer, the term of this patent is extended or adjusted under 35 U.S.C. 154(b) by 528 days.

(21) Appl. No.: 12/903,656

(22) Filed: Oct. 13, 2010

(65) Prior Publication Data

US 2011/0085431 A1 Apr. 14, 2011

(30) Foreign Application Priority Data

Oct. 14, 2009 (JP) .................................. 2009-237760

(51) Int. Cl.
*G11B 7/00* (2006.01)
(52) U.S. Cl.
USPC .................................... 369/53.23; 369/53.28
(58) Field of Classification Search
USPC ........................................... 369/53.23, 53.28
See application file for complete search history.

(56) References Cited

U.S. PATENT DOCUMENTS

| 6,266,303 B1 * | 7/2001 | Buchler | 369/44.29 |
| 6,775,210 B1 * | 8/2004 | Tateishi | 369/44.41 |
| 2007/0025216 A1 * | 2/2007 | Kim et al. | 369/53.28 |

FOREIGN PATENT DOCUMENTS

JP  2001-216663  8/2001

* cited by examiner

*Primary Examiner* — Latanya Bibbins
(74) *Attorney, Agent, or Firm* — McDermott Will & Emery LLP

(57) ABSTRACT

An optical drive apparatus includes: a phase-difference detection-signal generating unit that generates PEDr based on PEROd and PEFOd obtained by delaying a phase-lead output signal indicating a phase lead amount of DA with respect to DB and X that is changed to high at a timing at which NAND of the DA and the DB is changed from high to low and changed to low at a timing at which OR of the DA and the DB is changed from high to low, and generates PADr based on PAROd and PAFOd obtained by delaying a phase-lag output signal indicating a phase lag amount of the DA with respect to the DB by a predetermined time and the X; and a DPD signal generating unit that generates a phase difference signal indicating a phase difference between the DA and the DB based on the PEDr and the PADr, and generates a DPD signal based on the phase difference signal.

9 Claims, 18 Drawing Sheets

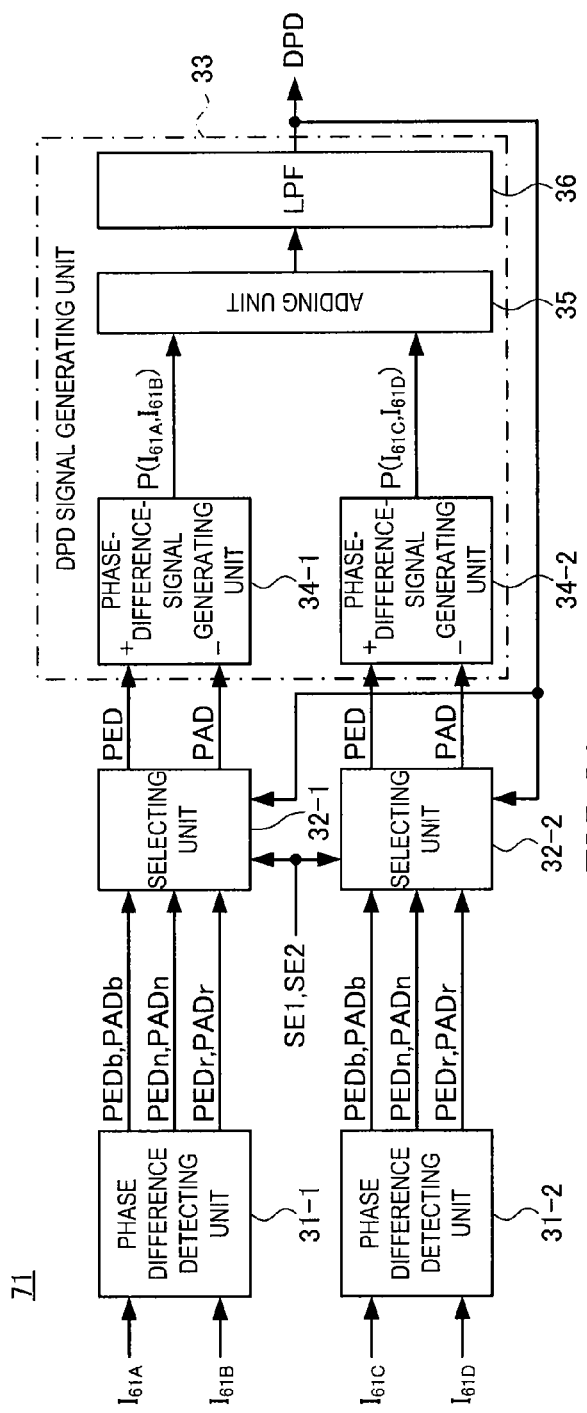
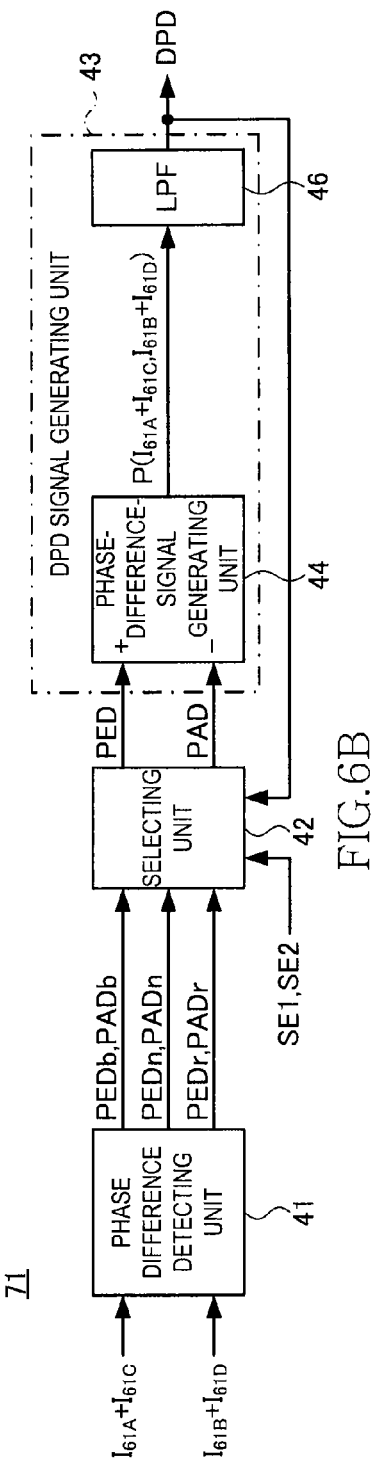
FIG.6A
FIG.6B

| MODE | SE2 | DPD | DDPD | SE1 | SELECTING UNIT OUTPUT |
|---|---|---|---|---|---|
| FORCED NORMAL MODE | L | – | L | H | PEDb,PADb |
| FORCED NORMAL DELAY MODE | L | – | L | L | PEDn,PADn |
| NORMAL MODE | H | DPD<−Δ, Δ<DPD | L | H | PEDb,PADb |
| NORMAL DELAY MODE | H | DPD<−Δ, Δ<DPD | L | L | PEDn,PADn |
| NOISE REMOVAL MODE | H | −Δ≦DPD≦Δ | H | – | PEDr,PADr |

FIG.14

A:−Δ<DPD<+Δ

B:DPD=−Δ,+Δ

C:DPD<−Δ,+Δ<DPD

A:−Δ<DPD<+Δ

B:DPD=−Δ,+Δ

C:DPD<−Δ,+Δ<DPD

A:$-\Delta < DPD < +\Delta$

B:$DPD = -\Delta, +\Delta$

C:$DPD < -\Delta, +\Delta < DPD$

OPTICAL DRIVE APPARATUS

TECHNICAL FIELD

The present invention relates to an optical drive apparatus, and more particularly relates to an optical drive apparatus that performs tracking servo by a differential phase detection (DPD) method.

BACKGROUND OF THE INVENTION

One of the methods to achieve tracking servo when performing recording and reproducing of an optical disk is a differential phase detection (DPD) method (for example, see Japanese Patent Application Laid-open No. 2001-216663). The DPD method uses a diffraction by a code (a recording mark) on a recording layer of a disk, in which a quadrant optical detector 100 as shown in FIG. 18 is used as an optical detector for receiving an optical beam reflected from a recording surface.

A light receiving surface of the optical detector 100 is arranged at a position to receive an optical beam, and as shown in FIG. 18, divided into four square-shaped areas (light receiving areas A to D) of the same dimension. The optical detector 100 outputs a signal having an amplitude of a value (a received light amount) obtained from a surface integral of an intensity of the optical beam over a light receiving surface for each of the light receiving areas.

In the DPP method, two phase difference signals $P(I_A, I_B)$ and $P(I_C, I_D)$ are obtained from an output signal of the optical detector 100, where $I_X$ is an output signal corresponding to a light receiving area X and $P(X, Y)$ is a function representing a phase difference between a signal X and a signal Y. A signal which is obtained by passing a sum signal $P(I_A, I_B)+P(I_C, I_D)$ obtained by adding the two signals through a low pass filter serves as a tracking error signal (a DPD signal) in the DPD method. Alternatively, a signal which is obtained by passing a signal $P(I_A+I_C, I_B+I_D)$ through the low pass filter can be used as the tracking error signal.

SUMMARY OF THE INVENTION

However, each of the output signals $I_A$ and $I_B$ may be superimposed with a noise individually. This noise appears in the phase difference signal or even in a DPD signal, causing degradation of precision of the tracking servo by the DPD method. Particularly, in a multilayer disk, a reflectivity of the disk is lower than that of a single-layer disk. Therefore, a signal-to-noise (S/N) ratio is deteriorated and an influence of the noise increases.

Therefore, an object of the present invention is to provide an optical drive apparatus that can suppress degradation of precision caused by a noise superimposed on an output signal of an optical detector in tracking servo by the DPD method.

An optical drive apparatus according to the present invention to achieve the above object is an optical drive apparatus includes an optical system for irradiating a recording surface of an optical disk with an optical beam; an optical detector that is divided into a plurality of light receiving areas and outputs a signal indicating an amount of a reflected light of the optical beam reflected from the recording surface for each of the light receiving areas; a signal generating unit that generates a first signal that becomes high when an output signal of the optical detector corresponding to at least one of the light receiving areas is equal to or larger than a predetermined value and becomes low otherwise and a second signal that becomes high when an output signal of the optical detector corresponding to other at least one of the light receiving areas is equal to or larger than a predetermined value and becomes low otherwise; a first phase-difference detection-signal generating unit that generates a phase lead detection signal based on a first delay signal obtained by delaying a phase-lead output signal indicating a phase lead amount of the first signal with respect to the second signal by a predetermined time and a third logical signal that is changed to high at a timing at which a first logical signal that becomes low when both the first and second signals are high and becomes high when either one of the first and second signals is low is changed from high to low, and changed to low at a timing at which a second logical signal that becomes high when either one of the first and second signal is high and becomes low when both the first and second signals are low is changed from high to low, and generates a phase lag detection signal based on a second delay signal obtained by delaying a phase-lag output signal indicating a phase lag amount of the first signal with respect to the second signal by a predetermined time and the third logical signal; and a DPD signal generating unit that generates a phase difference signal indicating a phase difference between the first and second signals based on the phase lead detection signal and the phase lag detection signal, and generates a DPD signal based on the phase difference signal.

According to the present invention, it is possible to prevent the noise superimposed on the output signal of the optical detector from appearing in the phase difference signal. Therefore, in the tracking servo that is performed using the above DPD signal, the degradation of precision due to the noise superimposed on the output signal of the optical detector can be suppressed.

In the above-mentioned optical drive, the phase-lead output signal may include a phase-lead rear-side output signal that becomes high when the first signal is low and the third logical signal is high and becomes low otherwise, and a phase-lead front-side output signal that becomes high when the first signal is high and the third logical signal is low and becomes low otherwise, the first delay signal may include a phase-lead rear-side delay signal obtained by delaying the phase-lead rear-side output signal by the predetermined time, and a phase-lead front-side delay signal obtained by delaying the phase-lead front-side output signal by the predetermined time, the phase lead detection signal may become high when either one of a phase-lead rear-side detection signal that becomes high when the phase-lead rear-side delay signal is high and the third logical signal is low and becomes low otherwise and a phase-lead front-side detection signal that becomes high when both the phase-lead front-side delay signal and the third logical signal are high and becomes low otherwise is high and may become low otherwise, the phase-lag output signal may include a phase-lag rear-side output signal that becomes high when the second signal is low and the third logical signal is high and becomes low otherwise, and a phase-lag front-side output signal that becomes high when the second signal is high and the third logical signal is low and becomes low otherwise, the second delay signal may include a phase-lag rear-side delay signal obtained by delaying the phase-lag rear-side output signal by the predetermined time, and a phase-lag front-side delay signal obtained by delaying the phase-lag front-side output signal by the predetermined time, and the phase lag detection signal may become high when either one of a phase-lag rear-side detection signal that becomes high when the phase-lag rear-side delay signal is high and the third logical signal is low and becomes low otherwise and a phase-lag front-side detection signal that becomes high when both the phase-lag front-side delay signal and the third logical signal are high and becomes low otherwise is high and may become low otherwise.

The above-mentioned optical drive may further includes a second phase-difference detection-signal generating unit that generates a phase lead detection signal and a phase lag detection signal without using the phase-lead rear-side detection signal, the phase-lead front-side detection signal, the phase-lag rear-side detection signal, and the phase-lag front-side detection signal; and a selecting unit that selects either one of the phase lead detection signal and the phase lag detection signal generated by the first phase-difference detection-signal generating unit and the phase lead detection signal and the phase lag detection signal generated by the second phase-difference detection-signal generating unit, in response to a value of the DPD signal, and the DPD signal generating unit may generate the phase difference signal based on the phase lead detection signal and the phase lag detection signal selected by the selecting unit.

In the above-mentioned optical drive, the selecting unit may select either one of the phase lead detection signal and the phase lag detection signal generated by the first phase-difference detection-signal generating unit and the phase lead detection signal and the phase lag detection signal generated by the second phase-difference detection-signal generating unit, in response to whether a value of the DPD signal is within a predetermined range, and the predetermined time may be equal to or longer than a survival time in a state without an influence of a noise of the phase-lead output signal or the phase-lag output signal when the value of the DPD signal is a limit value of the predetermined range.

In the above-mentioned optical drive, the optical detector may be a quadrant optical detector that is divided into light receiving areas including a first light receiving area to a fourth light receiving area, the first signal may become high when a sum signal of two output signals of the optical detector corresponding to the first and second light receiving areas is equal to or larger than a predetermined value and may become low otherwise, and the second signal may become high when a sum signal of two output signals of the optical detector corresponding to the third and fourth light receiving areas is equal to or larger than a predetermined value and may become low otherwise.

An optical drive apparatus according to another aspect of the present invention is an optical drive apparatus includes an optical system for irradiating a recording surface of an optical disk with an optical beam; an optical detector that is divided into light receiving areas including a first light receiving area to a fourth light receiving area and outputs a signal indicating an amount of a reflected light of the optical beam reflected from the recording surface for each of the light receiving areas; a signal generating unit that generates a first signal to a fourth signal each becoming high when an output signal of the optical detector corresponding to each of the first to fourth light receiving areas is equal to or larger than a predetermined value and becoming low otherwise; a first phase difference detecting unit that generates a phase lead detection signal and a phase lag detection signal based on the first and second signals; a second phase difference detecting unit that generates a phase lead detection signal and a phase lag detection signal based on the third and fourth signals; and a DPD signal generating unit that generates a DPD signal based on the phase lead detection signal and the phase lag detection signal generated by the first phase difference detecting unit and the phase lead detection signal and the phase lag detection signal generated by the second phase difference detecting unit, and each of the first and second phase difference detecting units includes a first phase-difference detection-signal generating unit that generates the phase lead detection signal based on a first delay signal obtained by delaying a phase-lead output signal indicating a phase lead amount of corresponding one of the first and third signals with respect to corresponding one of the second and fourth signals by a predetermined time and a third logical signal that is changed to high at a timing at which a first logical signal that becomes low when both the first and second signals are high and becomes high when either one of the first and second signals is low is changed from high to low, and changed to low at a timing at which a second logical signal that becomes high when either one of the first and second signal is high and becomes low when both the first and second signals are low is changed from high to low, and generates the phase lag detection signal based on a second delay signal obtained by delaying a phase-lag output signal indicating a phase lag amount of corresponding one of the first and third signals with respect to corresponding one of the second and fourth signals by a predetermined time and the third logical signal and the third logical signal.

According to the present invention, in tracking servo by the DPD method, it is possible to suppress the degradation of precision due to a noise superimposed on an output signal of an optical detector.

BRIEF DESCRIPTION OF THE DRAWINGS

The above features and advantages of the present invention will be more apparent from the following description of certain preferred embodiments taken in conjunction with the accompanying drawings, in which:

FIGS. 6A and 6B are schematic diagrams showing functional blocks inside the tracking-error-signal generating unit according to an embodiment of the present invention;

FIG. 14 shows a summary of the values of the setting signals, the value of the tracking error signal, the value of the binary signal, and a combination of the phase difference detection signal sets output from the selecting unit;

DETAILED DESCRIPTION OF THE EMBODIMENTS

Preferred embodiments of the present invention will be explained below in detail with reference to the accompanying drawings.

Figure 1:
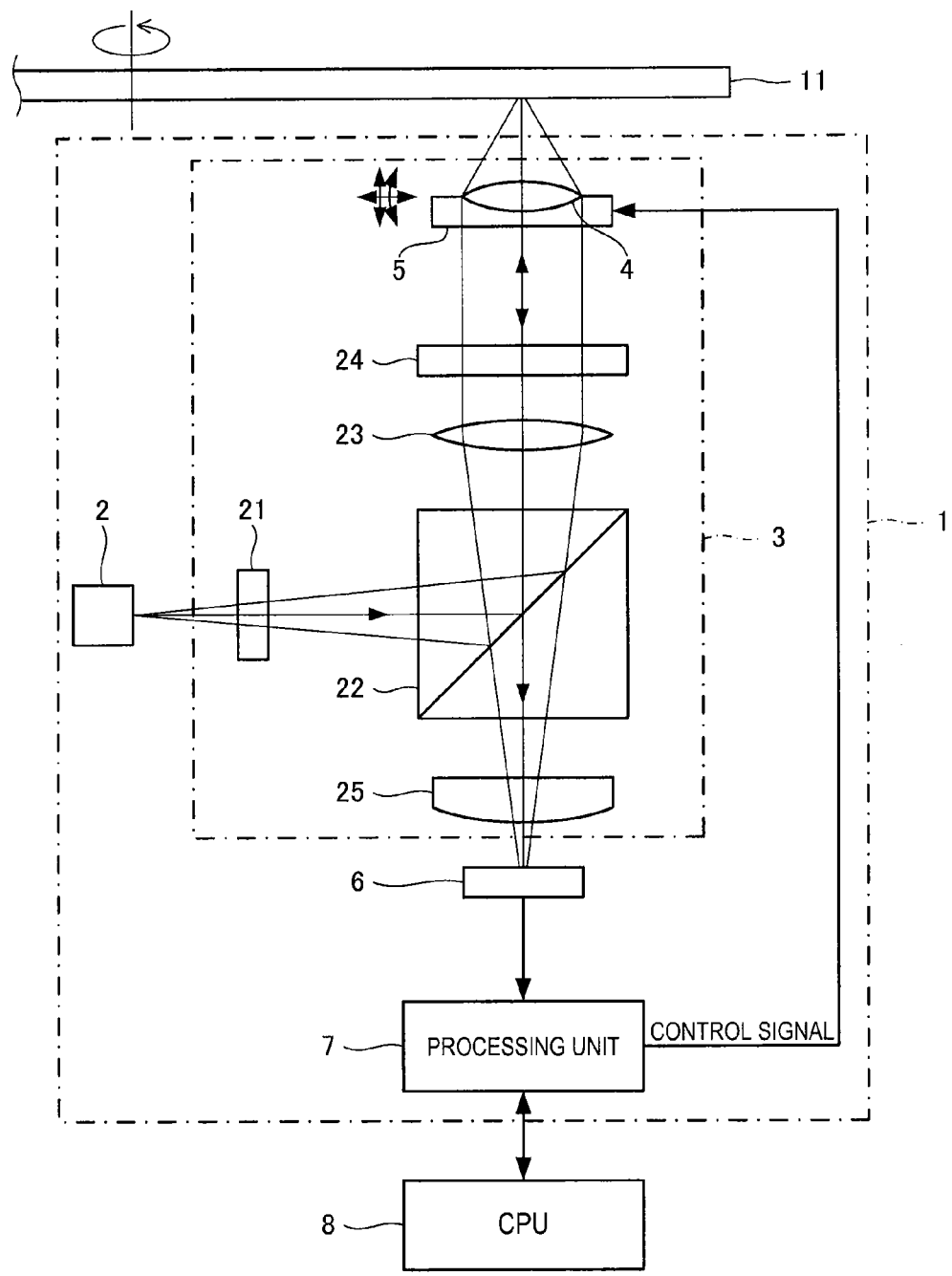
FIG. 1 is a schematic diagram of an optical drive apparatus according to an embodiment of the present invention.

FIG. 1 is a schematic diagram of an optical drive apparatus 1 according to an embodiment of the present invention.

The optical drive apparatus 1 performs reproducing and recording data with respect to an optical disk 11. Although various optical recording media, such as CD, DVD, and BD, can be used as the optical disk 11, a plate-shaped optical disk having a recording surface that is multilayered by multilayer films is particularly used in the first embodiment. In addition, although the optical disk includes several types that are classified by a recording method, such as a read only type (such as DVD-ROM and BD-ROM), a recordable type (such as DVD-R, DVD+R, and BD-R) and a rewritable type (such as DVD-RAM, DVD-RW, and BD-RE), the present embodiment can be applied to any type of optical disk.

Figure 2:
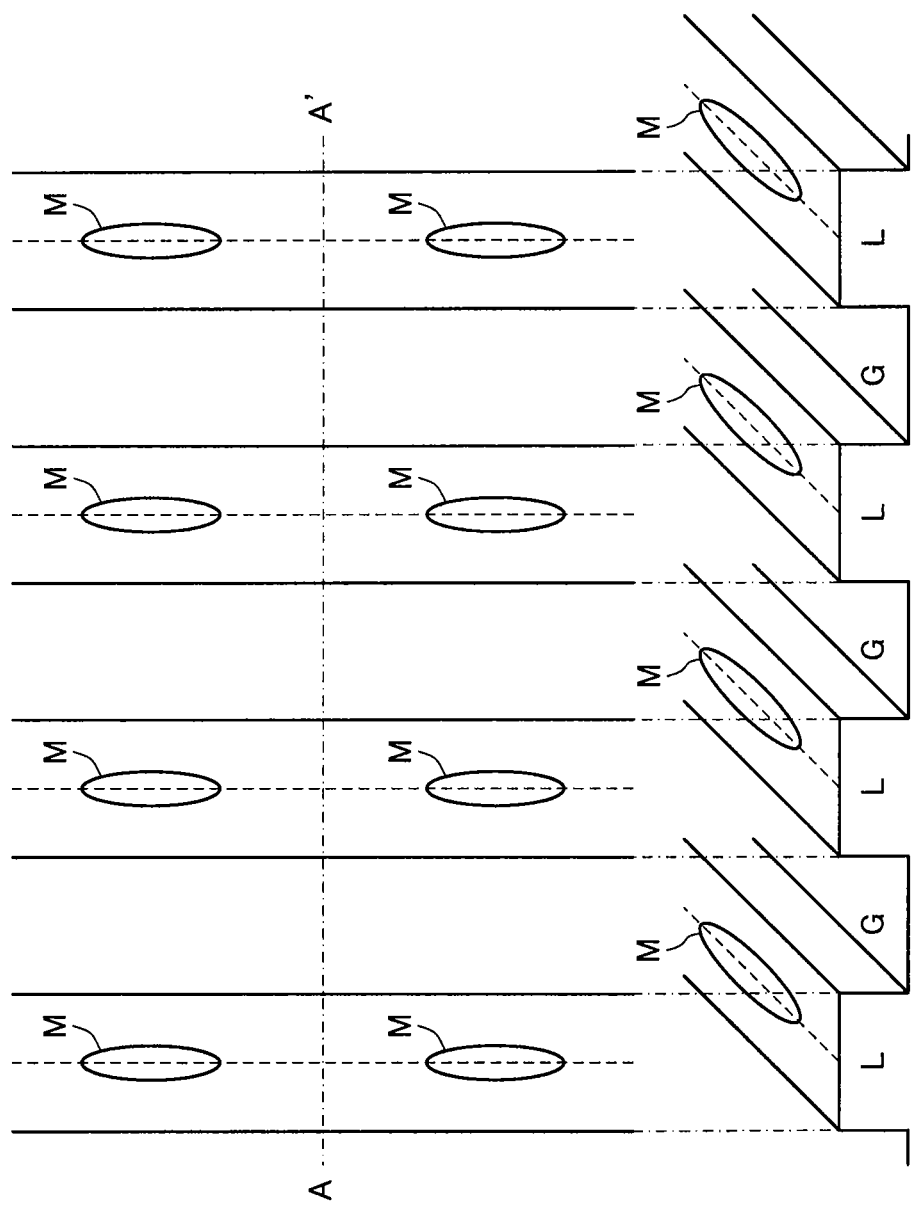
FIG. 2A is a plan view of a recording layer of the optical disk according to an embodiment of the present invention.
FIG. 2B is a cross section along a line A-A' shown in FIG. 2A.

FIG. 2A is a plan view of a recording layer of the optical disk 11, and FIG. 2B is a cross section of the recording layer along a line A-A' shown in FIG. 2A.

As shown in FIGS. 2A and 2B, the recording layer has a plurality of tracks arranged at regular intervals. A convex portion of a track is called a land L, and a recess portion of the track is called a groove G. However, the convex portion and the recess portion of the track are relative to each other, and which one of the convex portion and the recess portion is called the land L varies according to a front surface or a back surface of the optical disk 11 whichever faces downwards. Although the land L and the groove G are drawn in a straight line in FIGS. 2A and 2B, in practice, they are slightly wobbling in a radial direction. The land L and the groove G are used when performing tracking servo by a differential push-pull (DPP) method, and they are not essential in the present invention.

In the example shown in FIGS. 2A and 2B, the land L is a data write line, so that a code (a pit or a recording mark) M for storing data is provided on the land L. The code M is drawn with a lateral width much narrower than a width of the land L in FIGS. 2A and 2B for the sake of viewability of the drawings. The actual lateral width of the code M is slightly smaller than the width of the land L. The code M is recorded or deleted by an irradiation with an optical beam. A non-recorded area of the optical disk 11 is an area in which the code M is not recorded. The data write line can be provided on the groove G or can be provided on both the land L and the groove G.

Referring back to FIG. 1, the optical drive apparatus 1 includes a laser light source 2, an optical system 3, an optical detector 6, and a processing unit 7. Among these constituent elements, the laser light source 2, the optical system 3, and the optical detector 6 constitute an optical pickup.

The optical system 3 includes a diffraction grating 21, a beam splitter 22, a collimator lens 23, a quarter-wave plate 24, a sensor lens (a cylindrical lens) 25, an objective lens 4, and an actuator 5. The optical system 3 serves as an outward path optical system that guides an optical beam emitted from the laser light source 2 to the optical disk 11, and at the same time, serves as a return path optical system that guides a reflected optical beam reflected from the optical disk 11 to the optical detector 6.

First, in the outward path optical system, the diffraction grating 21 divides the optical beam emitted from the laser light source 2 into three beams (the zeroth-order diffracted light and the ±first-order diffracted lights) and inputs the three beams to the beam splitter 22 as p-polarized lights. The beam splitter 22 reflects the incident p-polarized lights and bends its pathway to the optical disk 11. The collimator lens 23 collimates an optical beam input from the beam splitter 22. The quarter-wave plate 24 turns the optical beam passed through the collimator lens 23 into a circularly-polarized light. The optical beam passed through the quarter-wave plate 24 is input to the objective lens 4.

The objective lens 4 focuses the optical beam input from the quarter-wave plate 24 (the collimated optical beam) on the optical disk 11, and collimates a reflected optical beam reflected from the recording surface of the optical disk 11. The reflected optical beam is diffracted by a land and a groove of the recording surface, which is resolved into a zeroth-order diffracted light and ±first-order diffracted lights. These zeroth-order diffracted light and ±first-order diffracted lights are different from the zeroth-order diffracted light and the ±first-order diffracted lights generated by the diffraction grating 21. Hereinafter, to avoid a confusion, the zeroth-order diffracted light, the +(plus) first-order diffracted light, and the −(minus) first-order diffracted light generated by the diffraction grating 21 are referred to as "main beam MB", "sub-beam SB1", and "sub-beam SB2", respectively, and the zeroth-order diffracted light and the ±first-order diffracted lights indicate the diffracted lights generated by the land and the groove of the recoding surface. Each of the main beam MB, the sub-beam SB1, and the sub-beam SB2 generates a separate reflected light.

The actuator 5 performs a control of position and balance of the objective lens 4 in response to a control signal (a control voltage) input from the processing unit 7. The actuator 5 has a three-axis configuration with a function of rotating the objective lens 4 (particularly in a radial direction) with respect to the recording surface of the optical disk 11 (tilt servo) as well as functions of moving the objective lens 4 in a direction perpendicular to the recording surface of the optical disk 11 in a linear manner (focus servo) and moving the objective lens 4 in a direction parallel to the recording surface of the optical disk 11 (tracking servo) in a linear manner. If the objective lens 4 is rotated with respect to the recording surface of the optical disk 11, an incident angle of the optical beam on the optical disk 11 is changed.

In the return path optical system, the optical beam that became an s-polarized light by passing through the objective lens 4 and reciprocating the quarter-wave plate 24 is incident on the collimator lens 23. The optical beam passed through the collimator lens 23 is incident on the beam splitter 22 while being focused. The beam splitter 22 passes the incident optical beam and inputs the optical beam to the sensor lens (a cylindrical lens). The sensor lens 25 applies an astigmatism to the optical beam that is input from the beam splitter 22. The optical beam that is applied with the astigmatism is incident on the optical detector 6.

Figure 3:
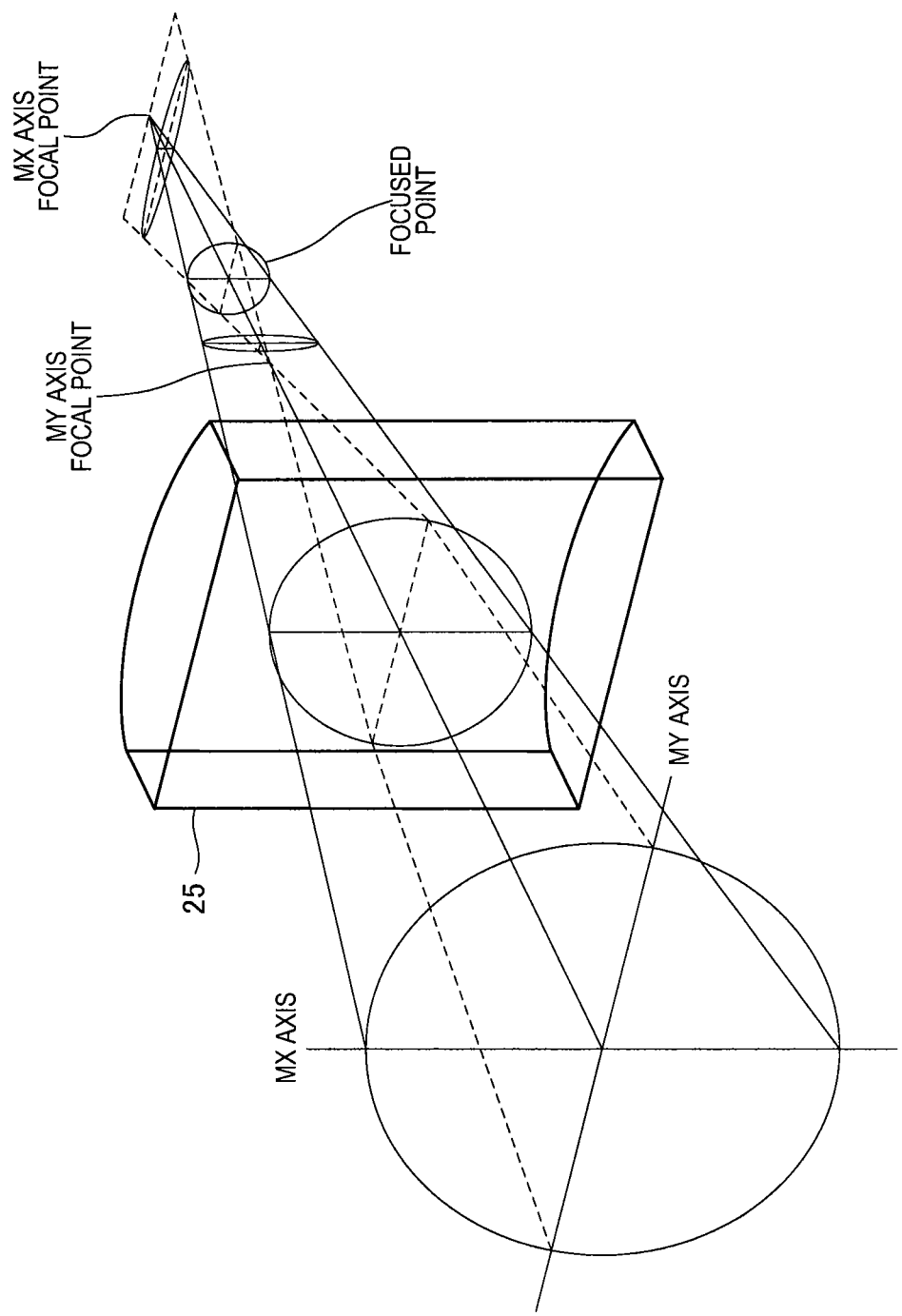
FIG. 3 is a schematic diagram for explaining the astigmatism applied by the sensor lens according to an embodiment of the present invention.

FIG. 3 is a schematic diagram for explaining the astigmatism applied by the sensor lens 25. As shown in FIG. 3, the sensor lens 25 has a lens effect only in one direction (an MY axis direction in FIG. 3=a tangential line direction). Therefore, a focal point of an optical system constituted by the collimator lens 23 (FIG. 1) and the sensor lens 25 is different between the MY axis direction and an MX axis direction (a sagittal line direction) that is perpendicular to the MY axis direction (MY axis focal point and MX axis focal point shown in FIG. 3). A point at which lengths of the optical beams in the MY axis direction and the MX axis direction are equal to each other is referred to as a focused point.

In the optical drive apparatus 1, a position control for the objective lens 4 is performed (focus servo) in such a manner that a focused point of an optical beam (a signal light) reflected from a layer to be focused (an access layer) is positioned right on the optical detector 6. In other words, a focused point of an optical beam (a stray light) reflected from layers other than the access layer is not positioned on the optical detector 6. Therefore, a spot (a stray light spot) that is formed on the optical detector 6 by the stray light has a shape elongated to at least one of the MY axis direction and the MX axis direction, as compared to a spot (a signal light spot) that is formed on the optical detector 6 by the signal light.

Referring back to FIG. 1, the optical detector 6 is arranged on a plane that intersects with an optical path of the reflected optical beam that is output from the optical system 3. The optical detector 6 includes three light receiving surfaces, and each of the light receiving surfaces is divided into a plurality of light receiving areas. In the optical drive apparatus 1, various signals including a tracking error signal, a focus error signal, and a full add signal can be generated by using an appropriate combination of the light receiving areas.

Figure 4:
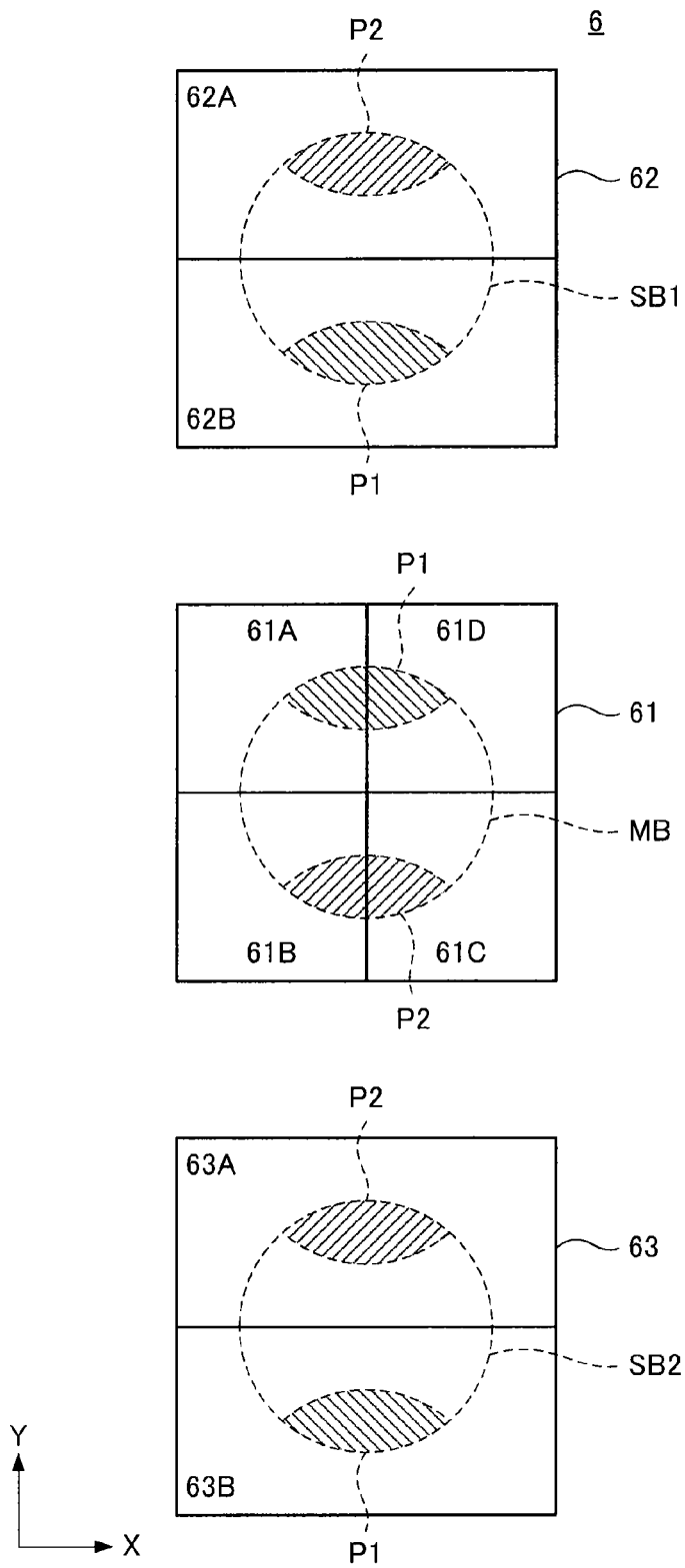
FIG. 4 is a top view of the optical detector according to an embodiment of the present invention.

FIG. 4 is a top view of the optical detector 6 according to the embodiment. FIG. 4 shows an example of a spot that is formed on a light receiving surface by a signal light. Each of areas P1 and P2 in the spot is an area in which a zeroth-order diffracted light and ±first-order diffracted lights interfere with each other (a push-pull area). X and Y directions shown in FIG. 4 correspond to a tangential direction and a radial direction of the optical disk, respectively.

As shown in FIG. 4, the optical detector 6 includes three square-shaped light receiving surfaces 61 to 63. The light receiving surface 61 is divided into four squares of the same dimension (light receiving areas 61A to 61D). Each of the light receiving surfaces 62 and 63 is divided into two rectangles of the same dimension up and down (light receiving areas 62A and 62B and light receiving areas 63A and 63B, respectively). The light receiving surfaces 61 to 63 are located at positions to receive the main beam MB, the sub-beam SB1, and the sub-beam SB2, respectively. The light receiving surfaces 62 and 63 are also used when performing tracking servo by the differential push-pull method, and they are not essential in the present invention.

Upon receiving an optical beam, the optical detector 6 outputs a signal having an amplitude of a value (a received light amount) obtained from a surface integral of an intensity of the optical beam over a light receiving surface for each of the light receiving areas. Hereinafter, an output signal corresponding to a light receiving area X is represented by $I_x$.

Referring back to FIG. 1, the processing unit 7 is constituted by, for example, a DSP (Digital Signal Processor) having an A/D converter function that converts an analog signal of multiple channels into digital data. The processing unit 7 receives an output signal of the optical detector 6, and generates the various signals described above. Details of the processing unit 7 are described later.

A CPU 8 is a built-in processing unit of a computer or a DVD recorder. The CPU 8 transmits an instruction signal for instructing either reproducing or writing and specifying an access point on the optical disk 11 to the processing unit via an interface (not shown). Upon receiving the instruction signal, the processing unit 7 achieves the on-track state (tracking servo) by controlling the objective lens 4 to move it in a direction parallel to the surface of the optical disk 11 (this operation is called "lens shift"). When the on-track state is achieved, the CPU 8 acquires the RF signal RF, which is generated by the processing unit 7, as a data signal.

Details of processes performed by the processing unit 7 are explained below.

Figure 5:
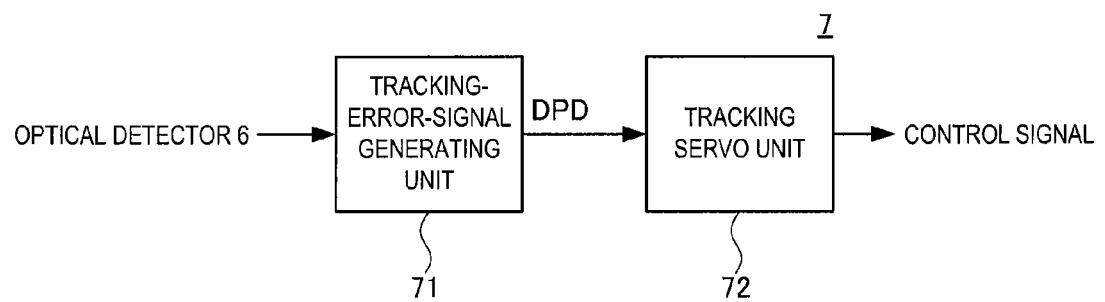
FIG. 5 is a schematic diagram showing functional blocks of the processing unit according to an embodiment of the present invention.

FIG. 5 is a schematic diagram showing functional blocks of the processing unit 7. As shown in FIG. 5, the processing unit 7 includes a tracking-error-signal generating unit 71 and a tracking servo unit 72.

The tracking-error-signal generating unit 71 generates a tracking error signal DPD (DPD signal) by the DPD method based on output signals $I_{61A}$ to $I_{61D}$ of the optical detector 6. A configuration to generate the tracking error signal DPD is explained in detail below.

FIGS. 6A and 6B are schematic diagrams showing functional blocks inside the tracking-error-signal generating unit 71. FIG. 6A shows functional blocks when generating the tracking error signal DPD by using a phase difference between the output signals $I_{61A}$ and $I_{61D}$ and a phase difference between the $I_{61C}$ and $I_{61D}$, and FIG. 6B shows functional blocks when generating the tracking error signal DPD by using a phase difference between a signal $I_{61A}+I_{61C}$ and a signal $I_{61B}+I_{61D}$.

The tracking-error-signal generating unit 71 according to the example of FIG. 6A includes a phase difference detecting unit 31-1 (first phase difference detecting unit), a phase difference detecting unit 31-2 (second phase difference detecting unit), selecting units 32-1 and 32-2 (selecting unit), and a DPD signal generating unit 33 (DPD signal generating unit).

The DPD signal generating unit 33 includes phase-difference-signal generating units 34-1 and 34-2, an adding unit 35, and an LPF (low pass filter) 36. The tracking-error-signal generating unit 71 according to the example of FIG. 6B includes a phase difference detecting unit 41, a selecting unit 42 (selecting unit), and a DPD signal generating unit 43 (DPD signal generating unit). The DPD signal generating unit 43 includes a phase-difference-signal generating unit 44 and an LPF (low pass filter) 46.

The phase difference detecting unit 31-1 includes two input terminals to which the output signals $I_{61A}$ and $I_{61B}$ are input, respectively. The phase difference detecting unit 31-1 generates three types of phase difference detection signal sets (first set constituted by a phase lead detection signal PEDb and a phase lag detection signal PADb, a second set constituted by a phase lead detection signal PEDn and a phase lag detection signal PADn, and a third set constituted by a phase lead detection signal PEDr and a phase lag detection signal PADr) based on these input signals, and outputs the generated signal sets to the selecting unit 32-1. The phase lead detection signal indicates a lead amount of the phase of the output signal $I_{61A}$ with respect to the output signal $I_{61B}$, and the phase lag detection signal indicates a lag amount of the phase of the $I_{61A}$ with respect to the output signal $I_{61B}$.

Figure 7:
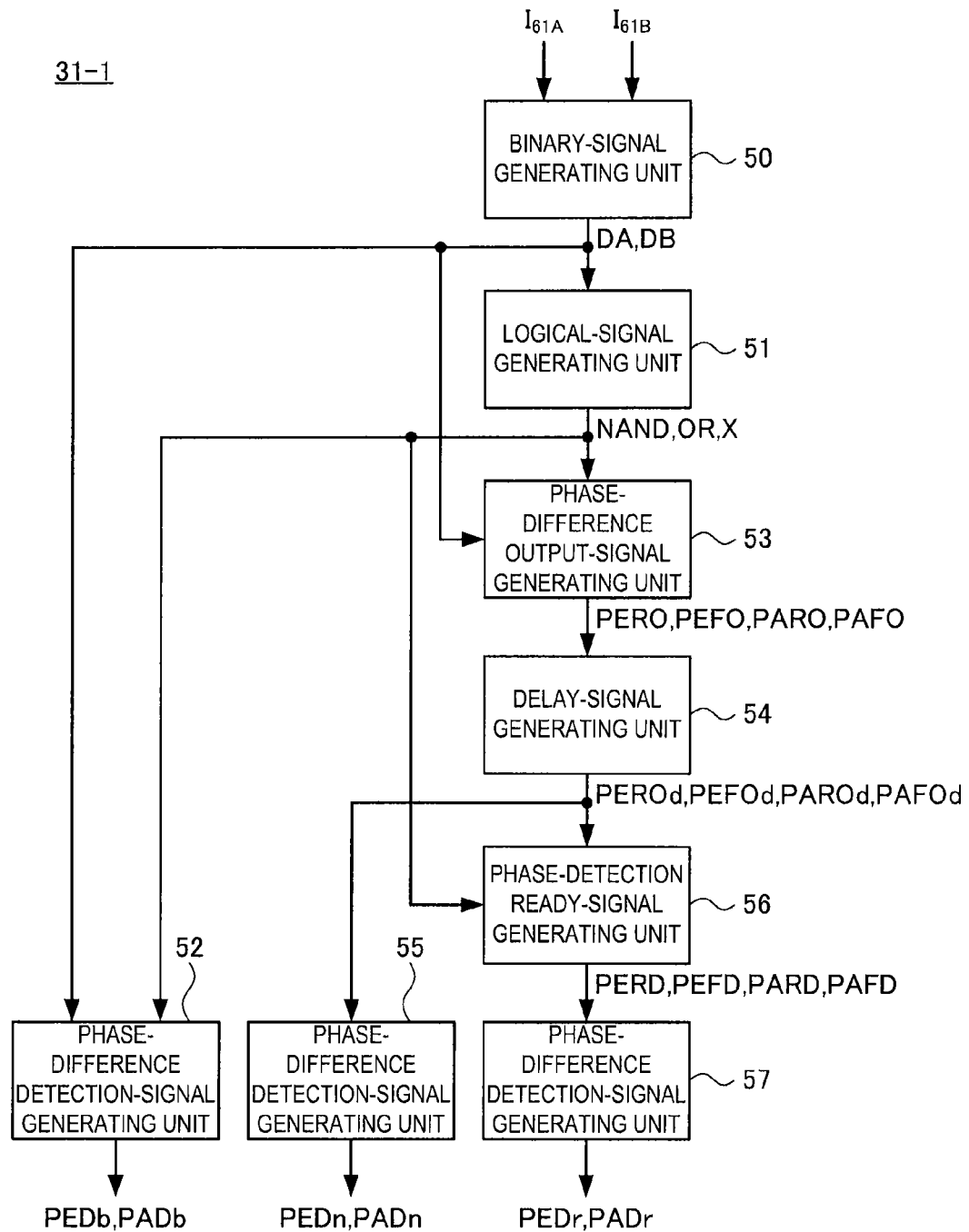
FIG. 7 is schematic diagram showing functional blocks inside the phase difference detecting unit according to an embodiment of the present invention.
Figure 10:
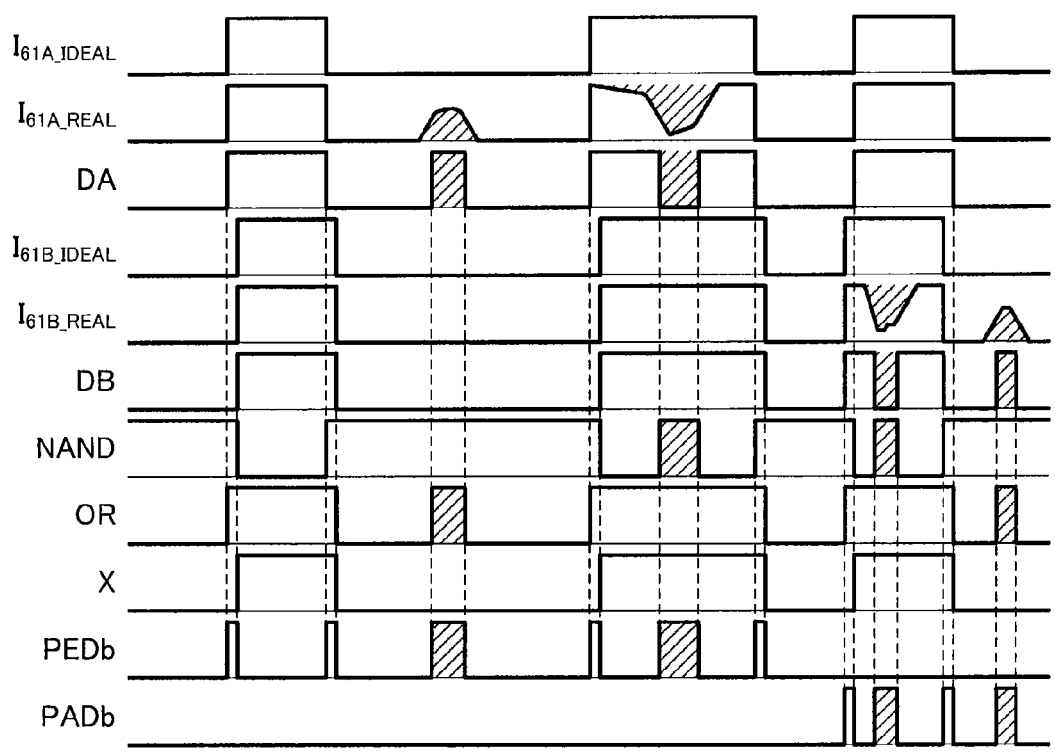
FIGS. 10 and 11 are diagrams showing timing charts of each signal generated by the phase difference detecting unit according to an embodiment of the present invention.
Figure 11:
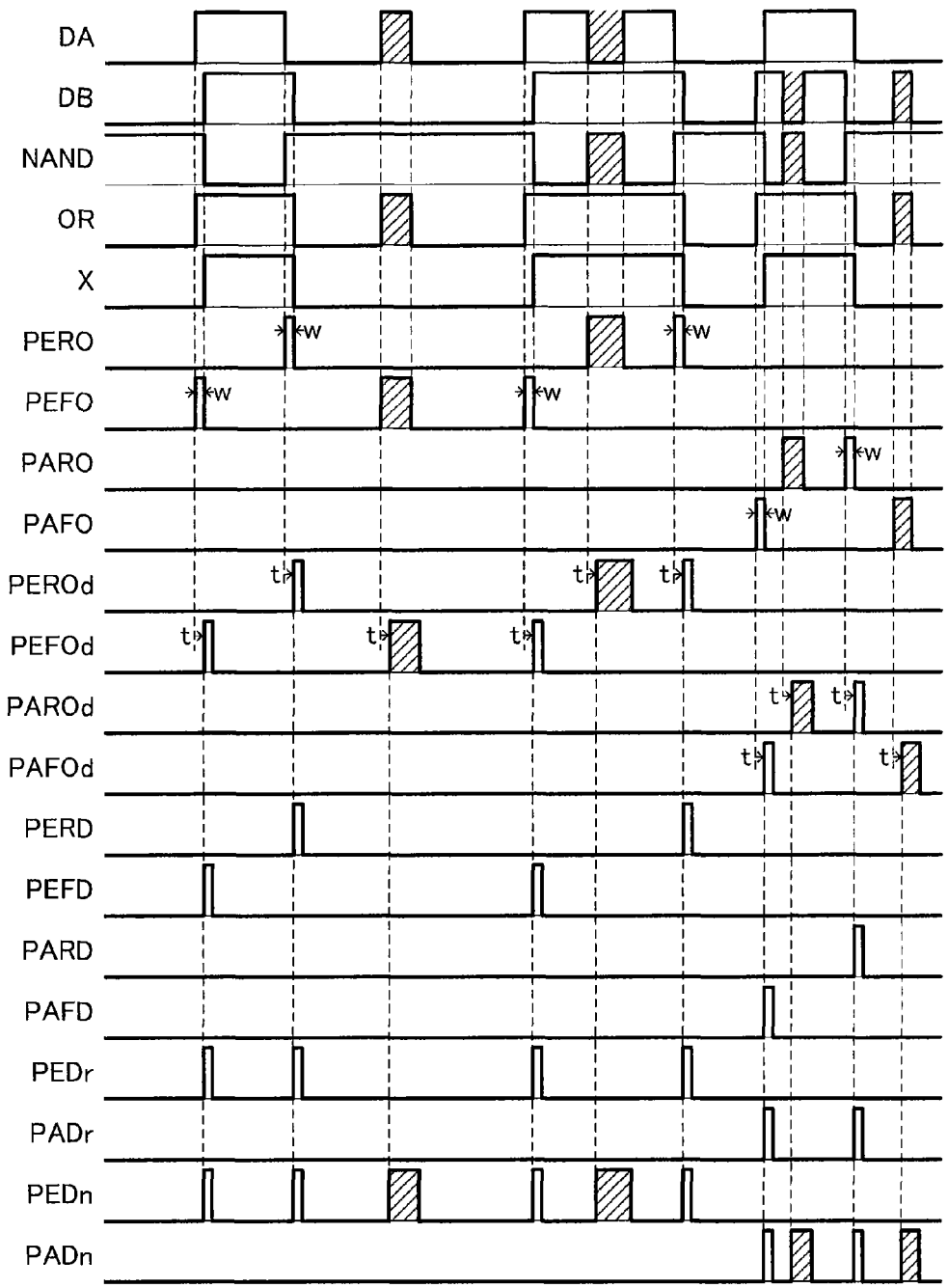

FIG. 7 is schematic diagram showing functional blocks inside the phase difference detecting unit 31-1. FIGS. 8A to 8C and FIGS. 9A to 9C are diagrams showing examples of specific logical circuits for realizing each of the functional blocks shown in FIG. 7. FIGS. 10 and 11 are diagrams showing timing charts of each signal generated by the phase difference detecting unit 31-1. A process of the phase difference detecting unit 31-1 is explained in detail below with reference to FIGS. 7 to 11.

As shown in FIG. 7, the phase difference detecting unit 31-1 includes a binary-signal generating unit 50 (signal generating unit), a logical-signal generating unit 51, a phase-difference detection-signal generating unit 52 (second phase-difference detection-signal generating unit), a phase-difference output-signal generating unit 53, a delay-signal generating unit 54, a phase-difference detection-signal generating unit 55 (second phase-difference detection-signal generating unit), a phase-detection ready-signal generating unit 56, and a phase-difference detection-signal generating unit 57 (first phase-difference detection-signal generating unit).

The binary-signal generating unit 50 generates binary signals, per the output signals $I_{61A}$ and $I_{61B}$ respectively input to two input terminals, which becomes high when the corresponding output signal is equal to or larger than a predetermined value and becomes low otherwise. That is, the binary-signal generating unit 50 generates a binary signal DA that becomes high when the output signal $I_{61A}$ is equal to or larger than a predetermined value and becomes low otherwise and a binary signal DB that becomes high when the output signal $I_{61B}$ is equal to or larger than a predetermined value and becomes low otherwise. The predetermined value is an intermediate value between the maximum value and the minimum value of each of the output signals. A specific voltage indicating high and low of each of the binary signal and the logical signal based on the binary signal is appropriately determined considering a dynamic range and the like of the circuit.

Output signals $I_{61A\_IDEAL}$ and $I_{61B\_IDEAL}$ shown in FIG. 10 indicate examples of the output signals $I_{61A}$ and $I_{61B}$ in an ideal state without noise. Although rising and falling of each of the output signals $I_{61A}$ and $I_{61B}$ actually change in an analog manner because they are output signals of a light receiving element, they are schematically represented in FIG. 10 with a rectangular waveform. In actual cases, a waveform of the output signal may be irregular due to an influence of the noise and the like, as the output signals $I_{61A\_REAL}$ and $I_{61B\_REAL}$ shown in FIG. 10. In FIG. 10, shaded portions correspond to portions of the signals in which the waveform became irregular due to the influence of the noise and the like. In this case, as shown in FIG. 10, this influence also appears on the binary signals DA and DB. An explanation is given below under an assumption that the binary signals DA and DB are influenced by the noise in the above manner.

The logical-signal generating unit 51 generates a first logical signal NAND, a second logical signal OR, and a third logical signal X shown in FIG. 10 by performing a logical operation on the binary signals DA and DB. The first logical signal NAND is a negative logical product signal of the binary signals DA and DB. The second logical signal OR is a sum signal of the binary signals DA and DB. The third logical signal X is a signal that becomes high at the falling of the first logical signal NAND and becomes low at the falling of the second logical signal OR.

Figure 8A:
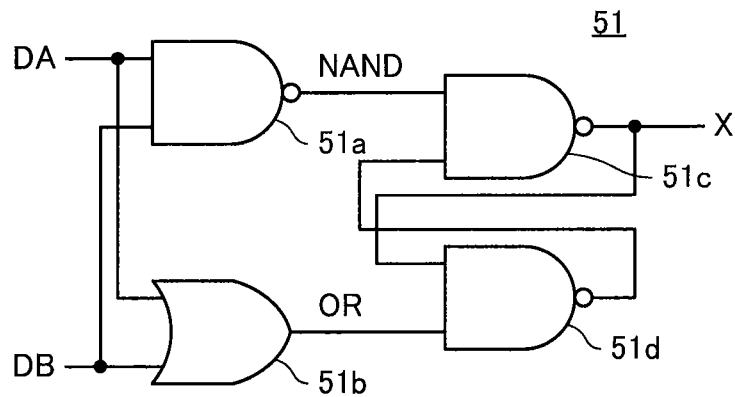
FIG. 8A shows an example of a specific logical circuit that constitutes the logical-signal generating unit according to an embodiment of the present invention.

FIG. 8A shows an example of a specific logical circuit that constitutes the logical-signal generating unit 51. As shown in FIG. 8A, the logical-signal generating unit 51 can be constituted by a NAND circuit 51a, an OR circuit 51b, and NAND circuits 51c and 51d. In this case, both the binary signals DA and DB are input to both the NAND circuit 51a and the OR circuit 51b. The first logical signal NAND is taken from an output of the NAND circuit 51a, and the second logical signal OR is taken from an output of the OR circuit 51b.

The first logical signal NAND and an output signal of the NAND circuit 51d are input to the NAND circuit 51c. On the other hand, the second logical signal OR and an output signal of the NAND circuit 51c are input to the NAND circuit 51d. The third logical signal X is taken from an output of the NAND circuit 51c.

Referring back to FIG. 7, the phase-difference detection-signal generating unit 52 generates the phase lead detection signal PEDb and the phase lag detection signal PADb shown in FIG. 10 by using the binary signals DA and DB and the third logical signal X. Specifically, the phase-difference detection-signal generating unit 52 calculates an exclusive logical sum of the binary signal DA and the third logical signal X and sets a result of the calculation as the phase lead detection signal PEDb, and calculates an exclusive logical sum of the binary signal DB and the third logical signal X and sets a result of the calculation as the phase lag detection signal PADb. As shown in FIG. 10, the noise superimposed on the output signal is remained in each of the phase lead detection signal PEDb and the phase lag detection signal PADb.

Figure 8B:
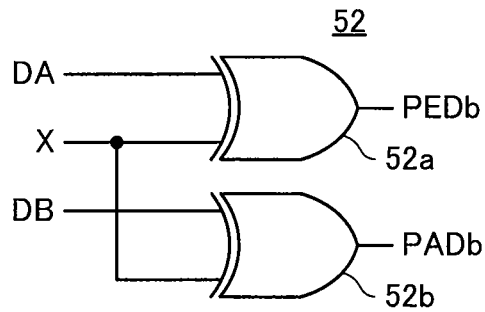
FIG. 8B shows an example of a specific logical circuit that constitutes the phase-difference detection-signal generating unit according to an embodiment of the present invention.

FIG. 8B shows an example of a specific logical circuit that constitutes the phase-difference detection-signal generating unit 52. As shown in FIG. 8B, the phase-difference detection-signal generating unit 52 is constituted by ExOR circuits 52a and 52b. In this case, the binary signal DA and the third logical signal X are input to the ExOR circuit 52a, and the binary signal DB and the third logical signal X are input to the ExOR circuit 52b. The phase lead detection signal PEDb and the phase lag detection signal PADb are taken from outputs of the ExOR circuits 52a and 52b, respectively.

Referring back to FIG. 7, the phase-difference output-signal generating unit 53 generates a phase-lead rear-side output signal PERO, a phase-lead front-side output signal PEFO, a phase-lag rear-side output signal PARO, and a phase-lag front-side output signal PAFO shown in FIG. 11 by using the binary signals DA and DB and the third logical signal X. Specifically, the phase-difference output-signal generating unit 53 generates a signal that becomes high when the binary signal DA is low and the third logical signal X is high and becomes low otherwise, and sets the generated signal as the phase-lead rear-side output signal PERO. Further, the phase-difference output-signal generating unit 53 generates a signal that becomes high when the binary signal DA is high and the third logical signal X is low and becomes low otherwise, and sets the generated signal as the phase-lead front-side output signal PEFO. Moreover, the phase-difference output-signal generating unit 53 generates a signal that becomes high when the binary signal DB is low and the third logical signal X is high and becomes low otherwise, and sets the generates signal as the phase-lag rear-side output signal PARO. In addition, the phase-difference output-signal generating unit 53 generates a signal that becomes high when the binary signal DB is high and the third logical signal X is low and becomes low otherwise, and sets the generates signal as the phase-lag front-side output signal PAFO.

The "rear-side" and "front-side" in each of names of the above signals mean that the signals correspond to the falling and the rising of the binary signal, respectively. The same is true for other signals described later.

Figure 8C:
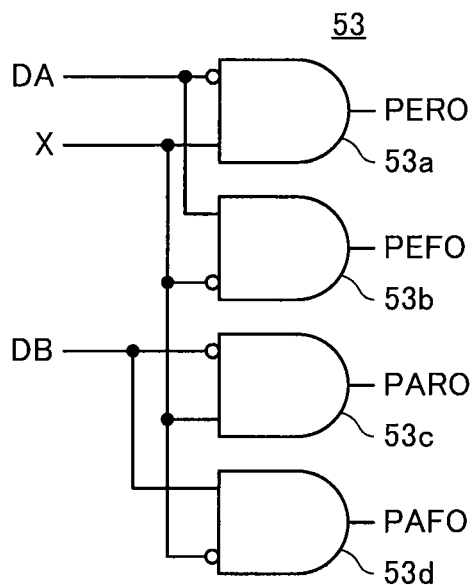
FIG. 8C shows an example of a specific logical circuit that constitutes the phase-difference output-signal generating unit according to an embodiment of the present invention.

FIG. 8C shows an example of a specific logical circuit that constitutes the phase-difference output-signal generating unit 53. As shown in FIG. 8C, the phase-difference output-signal generating unit 53 is constituted by AND circuits 53a to 53d. In this case, an inverted signal of the binary signal DA and the third logical signal X are input to the AND circuit 53a, the binary signal DA and an inverted signal of the third logical signal X are input to the AND circuit 53b, an inverted signal of the binary signal DB and the third logical signal X are input to the AND circuit 53c, and the binary signal DB and an inverted signal of the third logical signal X are input to the AND circuit 53d. The phase-lead rear-side output signal PERO, the phase-lead front-side output signal PEFO, the phase-lag rear-side output signal PARO, and the phase-lag front-side output signal PAFO are taken from outputs of the AND circuits 53a to 53d, respectively.

Subsequently, the delay-signal generating unit 54 generates delay signals PEROd and PEFOd (first delay signal) and delay signals PAROd and PAFOd (second delay signal), as shown in FIG. 11, by delaying each of the signals generated by the phase-difference output-signal generating unit 53 by a predetermined delay time t. A specific value of the delay time t is described later.

The phase-difference detection-signal generating unit 55 generates a phase lead detection signal PEDn and a phase lag detection signal PADn shown in FIG. 11 by using the delay signals PEROd, PEFOd, PAROd, and PAFOd. Specifically, the phase-difference detection-signal generating unit 55 calculates a logical sum of the delay signals PEROd and PEFOd and sets a result of the calculation as the phase lead detection signal PEDn. Further, the phase-difference detection-signal generating unit 55 calculates a logical sum of the delay signals PAROd and PAFOd and sets a result of the calculation as the phase lag detection signal PADn. As shown in FIG. 11, the noise superimposed on the output signal is also remained in each of the phase lead detection signal PEDn and the phase lag detection signal PADn. The phase lead detection signal PEDn and the phase lag detection signal PADn differ from the phase lead detection signal PEDb and the phase lag detection signal PADb in that these signals are delayed by the delay time t.

Figure 9A:
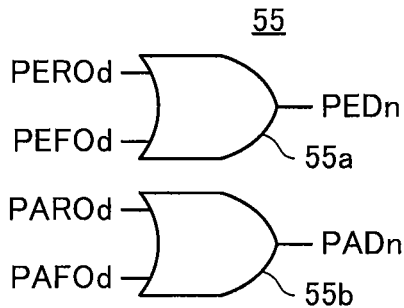
FIG. 9A shows an example of a specific logical circuit that constitutes the phase-difference detection-signal generating unit according to an embodiment of the present invention.

FIG. 9A shows an example of a specific logical circuit that constitutes the phase-difference detection-signal generating unit 55. As shown in FIG. 9A, the phase-difference detection-signal generating unit 55 is constituted by OR circuits 55a and 55b. In this case, the delay signals PEROd and PEFOd are input to the OR circuit 55a, and the delay signals PAROd and PAFOd are input to the OR circuit 55b. The phase lead detection signal PEDn and the phase lag detection signal PADn are taken from outputs of the OR circuits 55a and 55b, respectively.

The phase-detection ready-signal generating unit 56 generates a phase-lead rear-side detection signal PERD, a phase-lead front-side detection signal PEFD, a phase-lag rear-side detection signal PARD, and a phase-lag front-side detection signal PAFD shown in FIG. 11 by using the delay signals PEROd, PEFOd, PAROd, and PAFOd. Specifically, the phase-detection ready-signal generating unit 56 generates a signal that becomes high when the delay signal PEROd is high and the third logical signal X is low and becomes low otherwise, and sets the generated signal as the phase-lead rear-side detection signal PERD. Further, the phase-detection ready-signal generating unit 56 generates a signal that becomes high when the delay signal PEFOd is high and the third logical signal X is high and becomes low otherwise, and sets the generated signal as the phase-lead front-side detection signal PEFD. Moreover, the phase-detection ready-signal generating unit 56 generates a signal that becomes high when the delay signal PAROd is high and the third logical signal X is low and becomes low otherwise, and sets the generated signal as the phase-lag rear-side detection signal PARD. In addition, the phase-detection ready-signal generating unit 56 generates a signal that becomes high when the delay signal PAFOd is high and the third logical signal X is high and becomes low otherwise, and sets the generated signal as the phase-lag front-side detection signal PAFD.

Figure 9B:
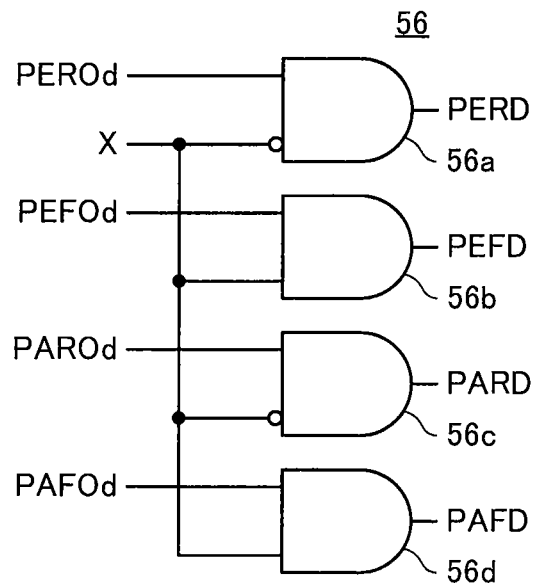
FIG. 9B shows an example of a specific logical circuit that constitutes the phase-detection ready-signal generating unit according to an embodiment of the present invention.

FIG. 9B shows an example of a specific logical circuit that constitutes the phase-detection ready-signal generating unit 56. As shown in FIG. 9B, the phase-detection ready-signal generating unit 56 is constituted by AND circuits 56a to 56d. In this case, the delay single PEROd and an inverted signal of the third logical signal X are input to the AND circuit 56a, the delay signal PEFOd and the third logical signal X are input to the AND circuit 56b, the delay signal PAROd and an inverted single of the third logical signal X are input to the AND circuit 56c, and the delay single PAFOd and the third logical signal X are input to the AND circuit 56d. The phase-lead rear-side detection signal PERD, the phase-lead front-side detection signal PEFD, the phase-lag rear-side detection signal PARD, and the phase-lag front-side detection signal PAFD are taken from outputs of the AND circuits 56a to 56d, respectively.

The phase-difference detection-signal generating unit 57 generates a phase lead detection signal PEDr and a phase lag detection signal PADr shown in FIG. 11 by using the phase-lead rear-side detection signal PERD, the phase-lead front-side detection signal PEFD, the phase-lag rear-side detection signal PARD, and the phase-lag front-side detection signal PAFD. Specifically, the phase-difference detection-signal generating unit 57 calculates a logical sum of the phase-lead rear-side detection signal PERD and the phase-lead front-side detection signal PEFD and sets a result of the calculation as the phase lead detection signal PEDr. Further, the phase-difference detection-signal generating unit 57 calculates a logical sum of the phase-lag rear-side detection signal PARD and the phase-lag front-side detection signal PAFD and sets a result of the calculation as the phase lag detection signal PADr. As shown in FIG. 11, the noise superimposed on the output signal is removed from the phase lead detection signal PEDr and the phase lag detection signal PADr.

Figure 9C:
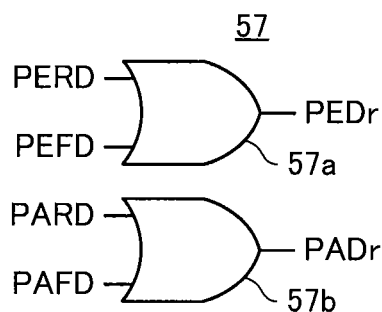
FIG. 9C shows an example of a specific logical circuit that constitutes the phase-difference detection-signal generating unit according to an embodiment of the present invention.

FIG. 9C shows an example of a specific logical circuit that constitutes the phase-difference detection-signal generating unit 57. As shown in FIG. 9C, the phase-difference detection-signal generating unit 57 is constituted by OR circuits 57a and 57b. In this case, the phase-lead rear-side detection signal PERD and the phase-lead front-side detection signal PFFD are input to the OR circuit 57a, and the phase-lag rear-side detection signal PARD and the phase-lag front-side detection signal PAFD are input to the OR circuit 57b. The phase lead detection signal PEDr and the phase lag detection signal PADr are taken from outputs of the OR circuits 57a and 57b, respectively.

Details of the processes of the phase difference detecting unit 31-1 are as described above.

Referring back to FIG. 6, the phase difference detecting units 31-2 and 41 are the same as the phase difference detecting unit 31-1, except that an input signal differs from that of the phase difference detecting unit 31-1. That is, the output signals $I_{61C}$ and $I_{61D}$ are input to a non-inverted input terminal and an inverted input terminal of the phase difference detecting unit 31-2, respectively, and a signal $I_{61A}+I_{61C}$ (a sum signal of the output signals $I_{61A}$ and $I_{61C}$) and a signal $I_{61B}+I_{61D}$ (a sum signal of the signals $I_{61B}$ and $I_{61D}$) are input to a non-inverted input terminal and an inverted input terminal of the phase difference detecting unit 41.

Each of the selecting unit 32-1 and 32-2 and the selecting unit 42 selects one of the three types of phase difference detection signal sets input from its corresponding phase difference detecting unit, and outputs the selected phase difference detection signal set to a corresponding one of the DPD signal generating units 33 and 43 as a phase difference detection signal set constituted by a phase lead detection signal PED and a phase lag detection signal PAD. Setting signals SE1 and SE2 and the tracking error signal DPD generated by a corresponding one of the DPD signal generating units 33 and 43 are input to each of the selecting units, and each of the selecting units performs the above selection based on theses input signals. The setting signals SE1 and SE2 and processes of the selecting units are described in detail later.

The DPD signal generating unit 33 generates the tracking error signal DPD by using the phase difference detection signal sets input from the selecting units 32-1 and 32-2. Specifically, the phase-difference-signal generating units 34-1 and 34-2 generate a phase difference signal $P(I_{61A}, I_{61B})$ and a phase difference signal $P(I_{61C}, I_{61D})$, respectively. As described earlier, $P(X, Y)$ is a function representing a phase difference between a signal X and a signal Y.

For example, the phase-difference-signal generating unit 34-1 is a subtracting circuit, which subtracts the phase lag detection signal PAD from the phase lead detection signal PED, and outputs a result of the subtraction as the phase difference signal $P(I_{61A}, I_{61B})$. That is, when a phase of the output signal $I_{61A}$ is advanced with respect to a phase of the output signal $I_{61B}$ of the optical detector 6, the phase-difference-signal generating unit 34-1 outputs the phase difference signal $P(I_{61A}, I_{61B})$ on a positive side in response to the phase lead detection signal PED, and when the phase is retarded, outputs the phase difference signal $P(I_{61A}, I_{61B})$ on a negative side in response to the phase lag detection signal PAD. The positive side and the negative side mean, taking the phase difference signal $P(I_{61A}, I_{61B})$ with no phase difference as a reference value, a positive side and a negative side with respect to the reference value. A specific number of the reference value is determined considering a dynamic range and the like of the circuit. Although not shown in the drawings, the phase difference signal $P(I_{61A}, I_{61B})$ is amplified as appropriate.

The phase difference signal $P(I_{61A}, I_{61B})$ and the phase difference signal $P(I_{61C}, I_{61D})$ respectively generated by the phase-difference-signal generating units 34-1 and 34-2 are input to the adding unit 35. The adding unit 35 generates a signal $P(I_{61A}, I_{61B})+P(I_{61C}, I_{61D})$ by adding the phase difference signal $P(I_{61A}, I_{61B})$ and the phase difference signal $P(I_{61C}, I_{61D})$, and outputs it to the LPF 36.

The LPF 36 is constituted by an integrating circuit. The signal $P(I_{61A}, I_{61B})+P(I_{61C}, I_{61D})$ input from the adding unit 35 passes through the LPF 36, by which a high frequency component is filtered from the signal $P(I_{61A}, I_{61B})+P(I_{61C}, I_{61D})$. A waveform of the signal $P(I_{61A}, I_{61B})+P(I_{61C}, I_{61D})$ from which the high frequency component is filtered becomes like shown in FIG. 12, and it is input to the tracking servo unit 72 shown in FIG. 5 as the tracking error signal DPD.

The DPD signal generating unit 43 is the same as the DPD signal generating unit 33, except that the DPD signal generating unit 43 outputs an output signal $P(I_{61A}+I_{61C}, I_{61B}+I_{61D})$ of the phase-difference-signal generating unit 44 directly to the LPF 46 without having the adding unit.

Figure 12:
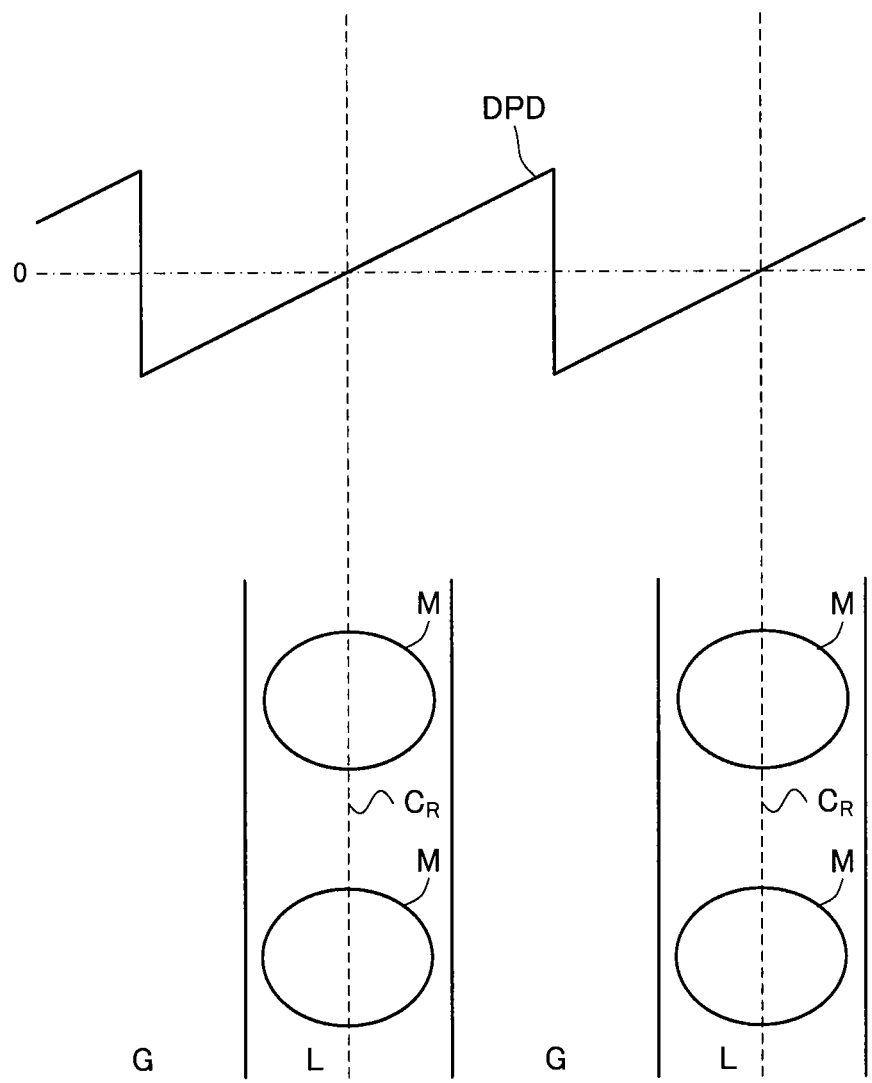
FIG. 12 is a schematic diagram showing an example of the tracking error signal according to an embodiment of the present invention.

FIG. 12 is a schematic diagram showing an example of the tracking error signal DPD generated in the above manner, where the horizontal axis represents a radial direction (a direction of a track jump). The bottom of FIG. 12 shows a plan view of the recording surface (including the code M, the land L, and the groove G) for the purpose of reference. A line $C_R$ shown in FIG. 12 indicates a center of a track. In the example shown in FIG. 12, the center of the track matches a center of the land L.

As shown in FIG. 12, the tracking error signal DPD is a signal that becomes zero when the focal position of the optical beam is at the center of the land L or the groove G. Near the center of the land L, which is the center of the track, the tracking error signal DPD is represented by a monotonically increasing function with a relatively moderate slope. Because the tracking error signal DPD is used basically in a ROM that does not have any land and groove, it is matter of course that it appears as the same waveform even without a land and a groove.

Referring back to FIG. 5, when the instruction signal described above is input from the CPU 8, the tracking servo unit 72 starts a tracking servo by using the tracking error signal DPD input from the tracking-error-signal generating unit 71. Specifically, the tracking servo unit 72 causes the tracking error signal DPD to be zero by moving the objective lens 4 in a direction parallel to the recording surface of the optical disk 11 with the actuator 5.

It is preferable that the tracking servo unit 72 perform the tracking servo by using an RF signal RF (a full add signal) that is represented by the following equation (1). Because the reflectivity differs between the land L and the groove G, a value of the RF signal RF represented by the equation (1) differs between when the irradiation position of the optical beam is at the land L and when the irradiation position of the optical beam is at the groove G. Therefore, the tracking servo unit 72 can place the optical beam on the land L, not on the groove G, by performing the tracking servo only when the value of the RF signal RF indicates that the irradiation position of the optical beam is on the land L (a data writing line).

$$RF = I_{61A}+I_{61B}+I_{61C}+I_{61D} \qquad (1)$$

Details of processes of the selecting units 32-1 and 32-2 and the selecting unit 42 (FIG. 6) and the specific value of the delay time t (FIG. 11) are explained below.

Processes of each of the selecting units are explained first. Because processes of each of the selecting units are the same, those of the selecting unit 32-1 are explained below as an example.

As described above, the setting signals SE1 and SE2 and the tracking error signal DPD that is generated by the corresponding DPD signal generating unit 33 are input to the selecting unit 32-1. Each of the setting signals SE1 and SE2 is a signal that takes either high or low, which is externally set.

Figure 13:
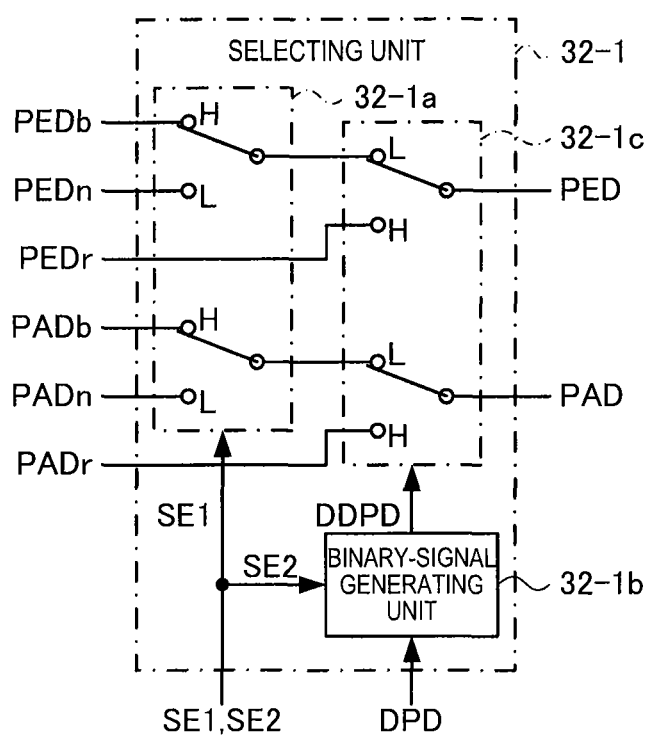
FIG. 13 shows an example of a specific circuit that constitutes the selecting unit according to an embodiment of the present invention.

FIG. 13 shows an example of a specific circuit that constitutes the selecting unit 32-1. As shown in FIG. 13, the selecting unit 32-1 includes a first switch circuit 32-1a, a binary-signal generating unit 32-1b, and a second switch circuit 32-1c.

A phase difference detection signal set constituted by the phase lead detection signal PEDb and the phase lag detection signal PADb and a phase difference detection signal set constituted by the phase lead detection signal PEDn and the phase lag detection signal PADn are input to the first switch circuit 32-1a. The first switch circuit 32-1a outputs either one of the phase difference detection signal sets in response to a value of the setting signal SE1. Specifically, the first switch circuit 32-1a outputs the phase difference detection signal set constituted by the phase lead detection signal PEDb and the phase lag detection signal PADb when the setting signal SE1 is high, and outputs the phase difference detection signal set constituted by the phase lead detection signal PEDn and the phase lag detection signal PADn when the setting signal SE1 is low.

The binary-signal generating unit 32-1b generates a binary signal DDPD that takes either high or low in response to the setting signal SE2 and the tracking error signal DPD, and outputs the binary signal DDPD. Specifically, the binary-signal generating unit 32-1b sets a value of the binary signal DDPD to low when a value of the setting signal SE2 is low. On the other hand, when the value of the setting signal SE2 is high, the binary-signal generating unit 32-1b sets the value of the binary signal DDPD to high if the value of the tracking error signal DPD is within a range from $+\Delta$ to $-\Delta$, and otherwise sets the value of the binary signal DDPD to low. The limit value $+\Delta$ ($-\Delta$) of the above range is an arbitrary value between the maximum value (or the minimum value) of the tracking error signal DPD and zero, which is set to the binary-signal generating unit 32-1b in advance.

An output of the first switch circuit 32-1a and a phase difference detection signal set constituted by the phase lead detection signal PEDr and the phase lag detection signal PADr are input to the second switch circuit 32-1c. The second switch circuit 32-1c outputs either one of the output of the first switch circuit 32-1a and the phase difference detection signal set in response to the value of the binary signal DDPD. Specifically, the second switch circuit 32-1c outputs the output of the first switch circuit 32-1a when the binary signal DDPD is low, and outputs the phase difference detection signal set constituted by the phase lead detection signal PEDr and the phase lag detection signal PADr when the binary signal DDPD is high. An output of the second switch circuit 32-1c becomes an output (a selection result) of the selecting unit 32-1.

The table shown in FIG. 14 shows a summary of the values of the setting signals SE1 and SE2, the value of the tracking error signal DPD, the value of the binary signal DDPD, and a combination of the phase difference detection signal sets output from the selecting unit 32-1. As shown in FIG. 14, hereinafter, a case where the setting signals SE2 and SE1 are low and high, respectively, is referred to as "forced normal mode", a case where both the setting signals SE2 and SE1 are low is referred to as "forced normal delay mode", a case where both the setting signals SE2 and SE1 are high and the value of the tracking error signal DPD is out of the range from $+\Delta$ to $-\Delta$ is referred to as "normal mode", a case where the setting signals SE2 and SE1 are high and low, respectively, and the value of the tracking error signal DPD is out of the range from $+\Delta$ to $-\Delta$ is referred to as "normal delay mode", and a case where the setting signal SE2 is high and the value of the tracking error signal DPD is within the range from $+\Delta$ to $-\Delta$ is referred to as "noise removal mode".

It is preferable to select each of the modes based on the following standard. That is, when the noise does not cause a serious problem considering a state of the optical disk 11 or the optical drive apparatus 1 or when performing a search of the optical disk 11 with a track jump, the noise removal mode may not be used by setting the setting signal SE2 to low. As is described later, if the noise removal mode is constantly set, the value of the tracking error signal DPD is limited within the range from $+\Delta$ to $-\Delta$. However, if the mode is switched based on the value of the tracking error signal DPD by setting the setting signal SE2 to high, and the setting of the setting signal SE1 is used in a combined manner, such a limit is addressed, which makes it possible to make full use of the tracking error signal DPD.

Further, with the arrangement, at least when the irradiation point of the optical beam is at the center of the track, the degradation of precision of the tracking servo is suppressed, which is caused by the noise superimposed on the output signal of the optical detector 6. If the noise removal mode is constantly set, the mode is not switched over to the other modes in an automatic manner because the value of the tracking error signal DPD is limited within the range from $+\Delta$ to $-\Delta$ as described above. Therefore, when performing a search of the optical disk 11 with a track jump, it is necessary to release the noise removal mode in a forced manner by setting the setting signal SE2 to low.

Next, the specific value of the delay time t is explained. Although FIG. 11 shows a temporal width (a survival time (a duration time of high level) in a state without an influence of the noise) w of the phase-lead rear-side output signal PERO and the like, the width w increases as the irradiation point of the optical beam is deviated from the center of the track. That is why the tracking error signal DPD becomes the signal shown in FIG. 12. It is preferable to set the delay time t to a value equal to or larger than the width w at the time when the value of the tracking error signal DPD becomes the limit value $+\Delta$ or $-\Delta$ (hereinafter, "time width $w_0$ corresponding to the DPD limit value"). The reason for this aspect is explained below.

Figure 15A:
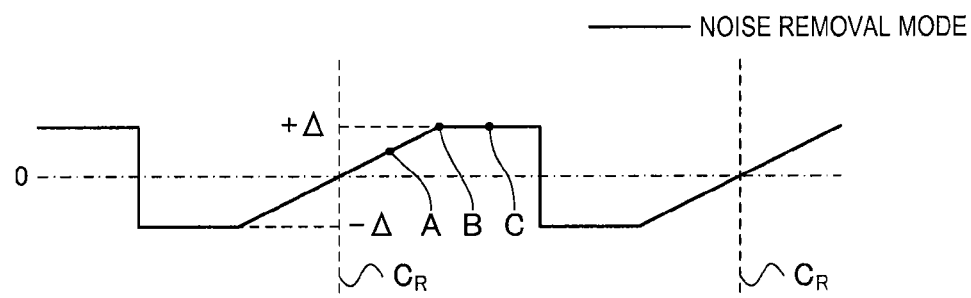
FIG. 15A shows the tracking error signal when the noise removal mode is set, drawn in the same manner as FIG. 12, on condition of the delay time t being equal to $w_0$.
Figure 15B:
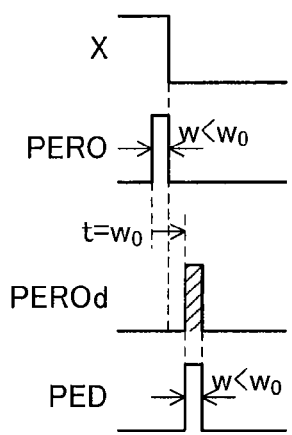
FIGS. 15B to 15D show the signals when the irradiation point of the optical beam is at points A to C shown in FIG. 15A, respectively.
Figure 15C:
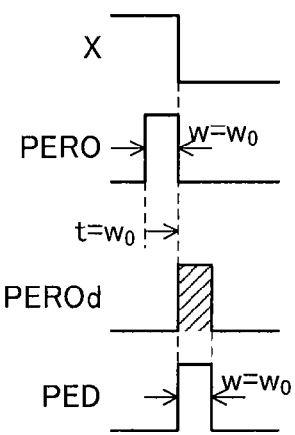
Figure 15D:
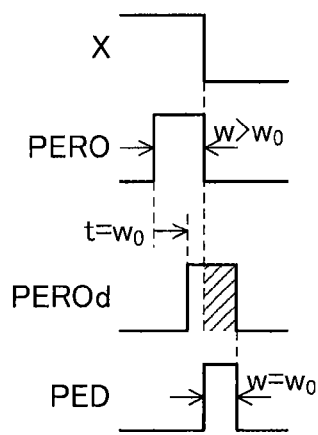

FIG. 15A shows the tracking error signal DPD when the noise removal mode is constantly set, drawn in the same manner as FIG. 12. FIGS. 15B to 15D show the third logical signal X, the phase-lead rear-side output signal PERO, the delay signal PEROd, and the phase lead detection signal PED when the irradiation point of the optical beam is at points A to C shown in FIG. 15A, respectively. In this example, the delay time t is equal to $w_0$.

When the irradiation point of the optical beam is at the point A shown in FIG. 15A, as shown in FIG. 15B, the whole delay single PEROd obtained by delaying the phase-lead rear-side output signal PERO by the delay time $t=w_0$ is remained on the phase lead detection signal PED. The same thing happens when the irradiation point of the optical beam is at the point B shown in FIG. 15A, and as shown in FIG. 15C, the whole delay signal PEROd is remained on the phase lead detection signal PED.

On the other hand, when the irradiation point of the optical beam is at the point C shown in FIG. 15A, as shown in FIG. 15D, only a part of the delay signal PEROd is remained on the phase lead detection signal PED. A time width of the part of the delay signal PEROd corresponds to $w_0$. That is, the part of the delay signal PEROd is cut. The reason why this happens is because a logical product of the inverted signal of the third logical signal X and the delay signal PEROd is used when generating the phase-lead rear-side detection signal PERD (see FIG. 9B). As a result, even if the irradiation point of the optical beam gets away from the center of the track beyond the point B, the time width w of the phase lead detection signal PED never increases beyond a value at the point B.

Figure 16A:
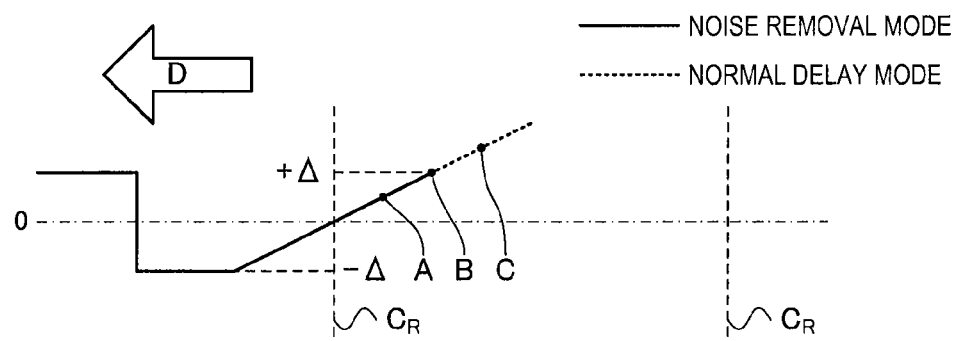
FIG. 16A shows the tracking error signal similarly to FIG. 15A, and shows a case where the normal delay mode is set at the point C shown in FIG. 15A, and the focal point of the optical beam moves in a direction indicated by an arrow D shown in FIG. 16A, on condition of the delay time t being equal to $w_0$.
Figure 16B:
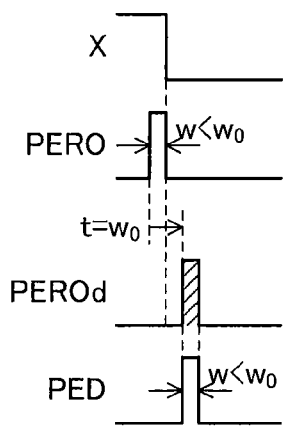
FIGS. 16B to 16D show the signals when the irradiation point of the optical beam is at points A to C shown in FIG. 16A, respectively.
Figure 16C:
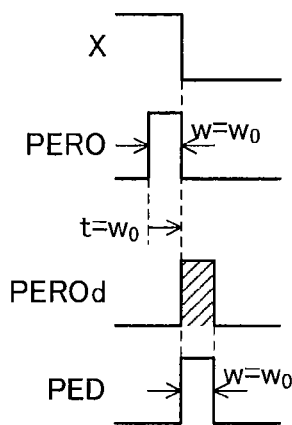
Figure 16D:
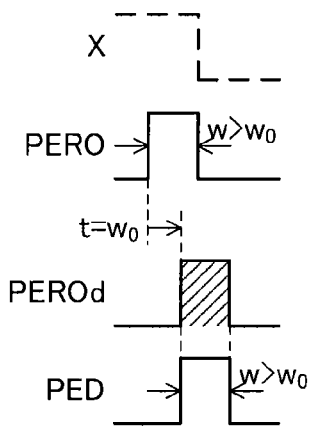

Although FIG. 16A shows the tracking error signal DPD similarly to FIG. 15A, it shows a case where the normal delay mode is set at the point C shown in FIG. 15A, and the focal point of the optical beam moves in a direction indicated by an arrow D shown in FIG. 16A. FIGS. 16B to 16D show the above signals when the irradiation point of the optical beam is at points A to C shown in FIG. 16A, respectively. Also in this case, the delay time t is equal to $w_0$. However, even if the delay time t is larger than $w_0$, the result will be the same. If the delay time t is set to a too large value, as is understood from FIG. 11, the noise may not be removed completely. Therefore, by setting the limit value Δ described above to as small a value as possible so that the delay time t can be decreased, a ratio of removing the noise can be increased. However, because the tracking error signal DPD can be deviated from the center of the track even in a tracking servo on state due to influences of various offset components and the noise, if a change of the tracking error signal DPD due to this deviation becomes larger than the limit value Δ, an effect of the noise removal does not appear sufficiently. Therefore, it is also not possible to reduce the limit value Δ too much.

As shown in FIG. 16D, when the irradiation point of the optical beam is at the point C shown in FIG. 16A, the whole delay signal PEROd is remained on the phase lead detection signal PED. This is because the delay signal PEROd is remained on the phase lead detection signal PED as it is in the normal delay mode (see FIG. 9A). As a result, the time width w of the phase lead detection signal PED is decreased in proportional to a distance from the center of the track when the irradiation point of the optical beam approaches the point B from the point C.

When the irradiation point of the optical beam just reaches the point B, in the normal delay mode, the value of the phase lead detection signal PED becomes just $w_0$. Although the mode is switched from the normal delay mode to the noise removal mode at the point B, the value of the phase lead detection signal PED is not changed from $w_0$ even after the mode is switched over to the noise removal mode (see FIG. 16C). That is, the value of the phase lead detection signal PED in the normal delay mode and the value of the phase lead detection signal PED in the noise removal mode are continuous.

When the irradiation point of the optical beam further approaches the center of the track, the values of the signals become the ones shown in FIG. 16B. Because details of FIG. 16B are identical to those explained with reference to FIG. 15A, explanations thereof will be omitted.

Figure 17A:
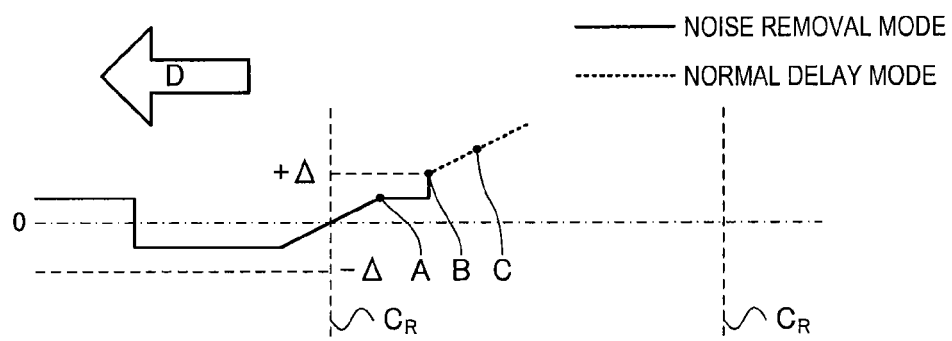
FIG. 17A shows the tracking error signal similarly to FIG. 15A, and shows a case where the normal delay mode is set at the point C shown in FIG. 15A, and the focal point of the optical beam moves in a direction indicated by an arrow D shown in FIG. 17A, on condition of the delay time t being equal to $w_0/2$.
Figure 17B:
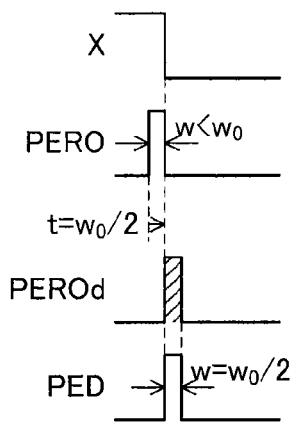
FIGS. 17B to 17D show the signals when the irradiation point of the optical beam is at points A to C shown in FIG. 17A, respectively.
Figure 17C:
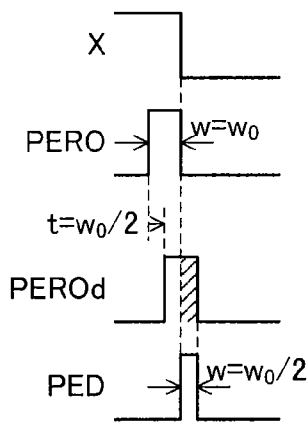
Figure 17D:
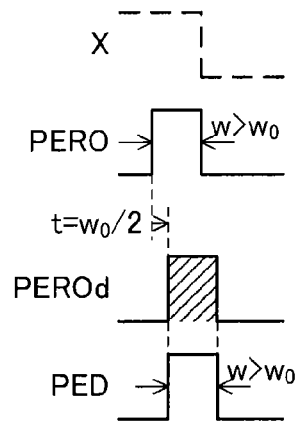
Figure 18:
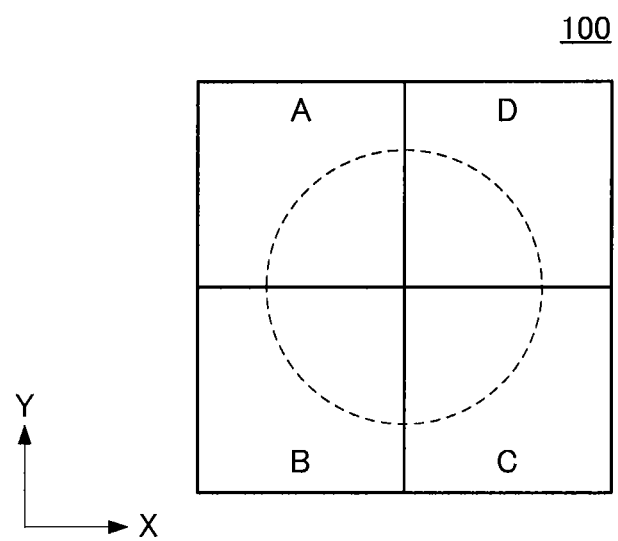
FIG. 18 is a top view of the quadrant optical detector according to a background technique of the present invention.

FIG. 17A shows the tracking error signal DPD similarly to FIG. 16A. As in FIG. 16A, FIG. 17A shows a case where the normal delay mode is set at the point C shown in FIG. 15A, and the focal point of the optical beam moves in a direction indicated by an arrow D. FIGS. 17B to 17D show the above signals when the irradiation point of the optical beam is at points A to C shown in FIG. 17A, respectively. In this case, the delay time t is equal to $w_0/2$.

The values of the signals when the irradiation point of the optical beam is at the point C shown in FIG. 17A becomes those shown in FIG. 17D. Because details of FIG. 17D are identical to those explained with reference to FIG. 16D, explanations thereof will be omitted.

When the irradiation point of the optical beam just reaches the point B, the value of the phase lead detection signal PED in the normal delay mode becomes just $w_0$ as described above. However, after the mode is switched to the noise removal mode, as shown in FIG. 17C, the value of the phase lead detection signal PED is changed to $w_0/2$. That is, the value of the phase lead detection signal PED in this case is changed discontinuously at the point B from $w_0$ to $w_0/2$.

It is not preferable that the value of the phase lead detection signal PED be changed discontinuously in this manner. This discontinuous change is caused as the delay time t is set to a value smaller than the time width $w_0$ corresponding to the DPD limit value. Therefore, it is preferable to set the delay time t to a value equal to or larger than the time width $w_0$ corresponding to the DPD limit value not to cause a discontinuity of the value of the phase lead detection signal PED.

As described above, with the optical drive apparatus 1 according to the present embodiment, it is possible to prevent the noise superimposed on the output signal of the optical detector appearing on the phase difference signal in the noise removal mode. Therefore, in the tracking servo performed in the noise removal mode, the degradation of precision caused by the noise superimposed on the output signal of the optical detector is suppressed.

Further, because various modes in which the noise is remained are provided, as well as the noise removal mode, so that the mode can be switched in response to the setting signal and the tracking error signal DPD, it is possible to use the noise removal and the tracking error signal DPD having a large value as the situation demands.

Moreover, it is possible to prevent a discontinuity occurring on the phase difference signal by setting the delay time t to a value equal to or larger than the time width $w_0$ corresponding to the DPD limit value.

While preferred embodiments of the present invention have been explained above, the present invention is not at all limited to these embodiments, and it is needless to mention that the present invention can be carried out by various modes without departing from the scope thereof.

For example, in the above embodiment, high and low can be reversed. In the case of reversing high and low, the same reversing process is performed in each of the logical circuits described above according to reversing of high and low in the above embodiment. In addition, as the delay method, the phase difference signal can be generated by using a signal generated in the same manner based on signals obtained by delaying the binary signals DA and DB (or signals before being converted into the binary signals) and the logical signal X without a delay.

What is claimed is:

1. An optical drive apparatus comprising:
   an optical system for irradiating a recording surface of an optical disk with an optical beam;
   an optical detector that is divided into a plurality of light receiving areas and outputs a signal indicating an amount of a reflected light of the optical beam reflected from the recording surface for each of the light receiving areas;
   a signal generating unit that generates a first signal that becomes high when an output signal of the optical detector corresponding to at least one of the light receiving areas is equal to or larger than a predetermined value and becomes low otherwise and a second signal that becomes high when an output signal of the optical detector corresponding to other at least one of the light receiving areas is equal to or larger than a predetermined value and becomes low otherwise;
   a first phase-difference detection-signal generating unit that generates a phase lead detection signal based on a first delay signal obtained by delaying a phase-lead output signal indicating a phase lead amount of the first signal with respect to the second signal by a predetermined time and a third logical signal that is changed to high at a timing at which a first logical signal that becomes low when both the first and second signals are high and becomes high when either one of the first and second signals is low is changed from high to low, and changed to low at a timing at which a second logical signal that becomes high when either one of the first and second signal is high and becomes low when both the first and second signals are low is changed from high to low, and generates a phase lag detection signal based on a second delay signal obtained by delaying a phase-lag output signal indicating a phase lag amount of the first signal with respect to the second signal by a predetermined time and the third logical signal; and a DPD signal generating unit that generates a phase difference signal indicating a phase difference between the first and second signals based on the phase lead detection signal and the phase lag detection signal, and generates a DPD signal based on the phase difference signal.

2. The optical drive apparatus as claimed in claim 1, wherein the phase-lead output signal includes a phase-lead rear-side output signal that becomes high when the first signal is low and the third logical signal is high and becomes low otherwise, and a phase-lead front-side output signal that becomes high when the first signal is high and the third logical signal is low and becomes low otherwise, the first delay signal includes a phase-lead rear-side delay signal obtained by delaying the phase-lead rear-side output signal by the predetermined time, and a phase-lead front-side delay signal obtained by delaying the phase-lead front-side output signal by the predetermined time, the phase lead detection signal becomes high when either one of a phase-lead rear-side detection signal that becomes high when the phase-lead rear-side delay signal is high and the third logical signal is low and becomes low otherwise and a phase-lead front-side detection signal that becomes high when both the phase-lead front-side delay signal and the third logical signal are high and becomes low otherwise is high and becomes low otherwise, the phase-lag output signal includes a phase-lag rear-side output signal that becomes high when the second signal is low and the third logical signal is high and becomes low otherwise, and a phase-lag front-side output signal that becomes high when the second signal is high and the third logical signal is low and becomes low otherwise, the second delay signal includes a phase-lag rear-side delay signal obtained by delaying the phase-lag rear-side output signal by the predetermined time, and a phase-lag front-side delay signal obtained by delaying the phase-lag front-side output signal by the predetermined time, and the phase lag detection signal becomes high when either one of a phase-lag rear-side detection signal that becomes high when the phase-lag rear-side delay signal is high and the third logical signal is low and becomes low otherwise and a phase-lag front-side detection signal that becomes high when both the phase-lag front-side delay signal and the third logical signal are high and becomes low otherwise is high and becomes low otherwise.

3. The optical drive apparatus as claimed in claim 2, further comprising:

a second phase-difference detection-signal generating unit that generates a phase lead detection signal and a phase lag detection signal without using the phase-lead rear-side detection signal, the phase-lead front-side detection signal, the phase-lag rear-side detection signal, and the phase-lag front-side detection signal; and a selecting unit that selects either one of the phase lead detection signal and the phase lag detection signal generated by the first phase-difference detection-signal generating unit and the phase lead detection signal and the phase lag detection signal generated by the second phase-difference detection-signal generating unit, in response to a value of the DPD signal, wherein the DPD signal generating unit generates the phase difference signal based on the phase lead detection signal and the phase lag detection signal selected by the selecting unit.

4. The optical drive apparatus as claimed in claim 3, wherein the selecting unit selects either one of the phase lead detection signal and the phase lag detection signal generated by the first phase-difference detection-signal generating unit and the phase lead detection signal and the phase lag detection signal generated by the second phase-difference detection-signal generating unit, in response to whether a value of the DPD signal is within a predetermined range, and the predetermined time is equal to or longer than a survival time in a state without an influence of a noise of the phase-lead output signal or the phase-lag output signal when the value of the DPD signal is a limit value of the predetermined range.

5. The optical drive apparatus as claimed in claim 4, wherein the optical detector is a quadrant optical detector that is divided into light receiving areas including a first light receiving area to a fourth light receiving area, the first signal becomes high when a sum signal of two output signals of the optical detector corresponding to the first and second light receiving areas is equal to or larger than a predetermined value and becomes low otherwise, and the second signal becomes high when a sum signal of two output signals of the optical detector corresponding to the third and fourth light receiving areas is equal to or larger than a predetermined value and becomes low otherwise.

6. The optical drive apparatus as claimed in claim 3, wherein the optical detector is a quadrant optical detector that is divided into light receiving areas including a first light receiving area to a fourth light receiving area, the first signal becomes high when a sum signal of two output signals of the optical detector corresponding to the first and second light receiving areas is equal to or larger than a predetermined value and becomes low otherwise, and the second signal becomes high when a sum signal of two output signals of the optical detector corresponding to the third and fourth light receiving areas is equal to or larger than a predetermined value and becomes low otherwise.

7. The optical drive apparatus as claimed in claim 2, wherein
the optical detector is a quadrant optical detector that is divided into light receiving areas including a first light receiving area to a fourth light receiving area,
the first signal becomes high when a sum signal of two output signals of the optical detector corresponding to the first and second light receiving areas is equal to or larger than a predetermined value and becomes low otherwise, and
the second signal becomes high when a sum signal of two output signals of the optical detector corresponding to the third and fourth light receiving areas is equal to or larger than a predetermined value and becomes low otherwise.

8. The optical drive apparatus as claimed in claim 1, wherein
the optical detector is a quadrant optical detector that is divided into light receiving areas including a first light receiving area to a fourth light receiving area,
the first signal becomes high when a sum signal of two output signals of the optical detector corresponding to the first and second light receiving areas is equal to or larger than a predetermined value and becomes low otherwise, and
the second signal becomes high when a sum signal of two output signals of the optical detector corresponding to the third and fourth light receiving areas is equal to or larger than a predetermined value and becomes low otherwise.

9. An optical drive apparatus comprising:
an optical system for irradiating a recording surface of an optical disk with an optical beam;
an optical detector that is divided into light receiving areas including a first light receiving area to a fourth light receiving area and outputs a signal indicating an amount of a reflected light of the optical beam reflected from the recording surface for each of the light receiving areas;
a signal generating unit that generates a first signal to a fourth signal each becoming high when an output signal of the optical detector corresponding to each of the first to fourth light receiving areas is equal to or larger than a predetermined value and becoming low otherwise;
a first phase difference detecting unit that generates a phase lead detection signal and a phase lag detection signal based on the first and second signals;
a second phase difference detecting unit that generates a phase lead detection signal and a phase lag detection signal based on the third and fourth signals; and
a DPD signal generating unit that generates a DPD signal based on the phase lead detection signal and the phase lag detection signal generated by the first phase difference detecting unit and the phase lead detection signal and the phase lag detection signal generated by the second phase difference detecting unit, wherein
each of the first and second phase difference detecting units includes a first phase-difference detection-signal generating unit that generates the phase lead detection signal based on
a first delay signal obtained by delaying a phase-lead output signal indicating a phase lead amount of corresponding one of the first and third signals with respect to corresponding one of the second and fourth signals by a predetermined time and
a third logical signal that is changed to high at a timing at which a first logical signal that becomes low when both the first and second signals are high and becomes high when either one of the first and second signals is low is changed from high to low, and changed to low at a timing at which a second logical signal that becomes high when either one of the first and second signal is high and becomes low when both the first and second signals are low is changed from high to low, and
generates the phase lag detection signal based on
a second delay signal obtained by delaying a phase-lag output signal indicating a phase lag amount of corresponding one of the first and third signals with respect to corresponding one of the second and fourth signals by a predetermined time and
the third logical signal.

* * * * *